(12) United States Patent
Moriwaki et al.

(10) Patent No.: US 10,916,104 B2
(45) Date of Patent: Feb. 9, 2021

(54) MONEY DEPOSITING DEVICE, MONEY DISPENSING DEVICE, PORTABLE DEVICE, AND MONEY DEPOSITING AND DISPENSING SYSTEM

(71) Applicant: GLORY LTD., Hyogo (JP)

(72) Inventors: Sotaro Moriwaki, Hyogo (JP); Jun Hisanaga, Hyogo (JP)

(73) Assignee: GLORY LTD., Hyogo (JP)

( * ) Notice: Subject to any disclaimer, the term of this patent is extended or adjusted under 35 U.S.C. 154(b) by 0 days.

(21) Appl. No.: 16/491,238

(22) PCT Filed: Mar. 2, 2018

(86) PCT No.: PCT/JP2018/007928
§ 371 (c)(1),
(2) Date: Sep. 5, 2019

(87) PCT Pub. No.: WO2018/163980
PCT Pub. Date: Sep. 13, 2018

(65) Prior Publication Data
US 2020/0035069 A1 Jan. 30, 2020

(30) Foreign Application Priority Data

Mar. 6, 2017 (JP) .................................. 2017-041904

(51) Int. Cl.
*G07F 19/00* (2006.01)
*G06Q 20/32* (2012.01)
*G07D 11/00* (2019.01)

(52) U.S. Cl.
CPC ....... *G07F 19/202* (2013.01); *G06Q 20/3276* (2013.01); *G06Q 20/3278* (2013.01);
(Continued)

(58) Field of Classification Search
None
See application file for complete search history.

(56) References Cited

U.S. PATENT DOCUMENTS

| | | | | |
|---|---|---|---|---|
| 6,536,662 B1* | 3/2003 | Ohno | ...................... | G07F 19/20 235/379 |
| 2011/0251956 A1* | 10/2011 | Cantley | ................. | G07F 19/202 705/43 |
| 2013/0238497 A1* | 9/2013 | Ramachandran | ...... | G06Q 20/40 705/41 |

FOREIGN PATENT DOCUMENTS

| | | |
|---|---|---|
| JP | 2010-049645 | 3/2010 |
| JP | 2010-204793 A | 9/2010 |

(Continued)

OTHER PUBLICATIONS

International Search Report issued in International Patent Application No. PCT/JP2018/007928, dated Apr. 17, 2018 w/ English translation.

(Continued)

*Primary Examiner* — Kristy A Haupt
(74) *Attorney, Agent, or Firm* — Greenblum & Bernstein, P.L.C.

(57) ABSTRACT

Provided is a money depositing device, comprising: a receiving unit that receives depositing instruction information on a depositing instruction from a portable device by wireless communication, the depositing instruction being accepted by the portable device from a user; a depositing processing unit that performs depositing processing of money placed into an inlet by the user in accordance with the depositing instruction information received by the receiving unit; and a transmitting unit that transmits a depositing result of the depositing processing performed by the depositing processing unit to the portable device by wireless communication.

19 Claims, 15 Drawing Sheets

(52) U.S. Cl.
CPC ......... *G07D 11/009* (2013.01); *G07F 19/203* (2013.01); *G07F 19/206* (2013.01)

(56) References Cited

FOREIGN PATENT DOCUMENTS

| | | |
|---|---|---|
| JP | 2013-117849 | 6/2013 |
| JP | 2014-93032 A | 5/2014 |
| JP | 2014-232471 | 12/2014 |
| JP | 2015-103204 | 6/2015 |
| JP | 2015-185044 | 10/2015 |
| JP | 2016-122330 | 7/2016 |

OTHER PUBLICATIONS

International Preliminary Report on Patentability issued in International Patent Application No. PCT/JP2018/007928, dated Apr. 17, 2018 (English translation).
The extended European search report dated Dec. 11, 2020 issued in European Application No. 18763705.3-1009.

\* cited by examiner

27a

| TRANSACTION STARTING DATE AND TIME | TRANSACTION ENDING DATE AND TIME | STORE IDENTIFICATION CODE | PROCESSING CONTENT | OPERATOR ID | PORTABLE DEVICE NUMBER | PROCESSING DEVICE NUMBER |
|---|---|---|---|---|---|---|
| 2017/01/19 08:03 | 2017/01/19 08:05 | A | CHANGE DISPENSING | 6789 | 02 | 003 |
| 2017/01/19 14:10 | 2017/01/19 14:13 | A | DEPOSITING | 6789 | 02 | 001 |
| 2017/01/19 16:40 | 2017/01/19 16:42 | A | CHANGE DISPENSING | 3456 | 02 | 003 |
| 2017/01/19 19:30 | 2017/01/19 19:33 | A | DEPOSITING | 6789 | 02 | 001 |

| | NUMBER OF DENOMINATIONS | | | | | | | | | TOTAL AMOUNT |
|---|---|---|---|---|---|---|---|---|---|---|
| 1 YEN | 5 YEN | 10 YEN | 50 YEN | 100 YEN | 500 YEN | 1000 YEN | 5000 YEN | 10000 YEN | | |
| 100 | 100 | 100 | 50 | 50 | 50 | | | | | 34100 |
| 50 | | 50 | | | | 15 | 10 | 20 | | 265000 |
| | | | | | | | | | | 1050 |
| | | | | | | 25 | 20 | 35 | | 475000 |

| TRANSACTION STARTING DATE AND TIME | TRANSACTION ENDING DATE AND TIME | STORE IDENTIFICATION CODE | PROCESSING CONTENT | OPERATOR ID | PORTABLE DEVICE NUMBER | PROCESSING DEVICE NUMBER |
|---|---|---|---|---|---|---|
| 2017/01/19 08:03 | 2017/01/19 08:05 | A | CHANGE DISPENSING | 6789 | 02 | 003 |
| 2017/01/19 08:08 | 2017/01/19 08:10 | B | CHANGE DISPENSING | 1234 | 05 | 003 |
| 2017/01/19 14:10 | 2017/01/19 14:13 | A | DEPOSITING | 6789 | 02 | 001 |
| 2017/01/19 15:10 | 2017/01/19 15:13 | B | CHANGE DISPENSING | 1234 | 05 | 004 |
| 2017/01/19 16:40 | 2017/01/19 16:42 | A | CHANGE DISPENSING | 3456 | 02 | 003 |
| 2017/01/19 19:30 | 2017/01/19 19:33 | A | DEPOSITING | 6789 | 02 | 001 |
| 2017/01/19 20:00 | 2017/01/19 20:03 | B | DEPOSITING | 1234 | 05 | 002 |

| DENOMINATION (NUMBER) | | | | | | | | AMOUNT |
|---|---|---|---|---|---|---|---|---|
| 1 YEN | 5 YEN | 10 YEN | 50 YEN | 100 YEN | 500 YEN | 1000 YEN | 5000 YEN | 10000 YEN | |
| 100 | 100 | 100 | 50 | 50 | 50 | | | | 34100 |
| 50 | 50 | 50 | 50 | 150 | 50 | | | | 43300 |
| | | | | | | 15 | 10 | 20 | 265000 |
| 50 | | 100 | | 100 | | 25 | 20 | 35 | 11000 |
| | | 50 | | | | | | | 1050 |
| | | | | | | 25 | 20 | 35 | 475000 |
| | | | | | | 30 | 15 | 10 | 205000 |

FIG. 12

MONEY DEPOSITING DEVICE, MONEY DISPENSING DEVICE, PORTABLE DEVICE, AND MONEY DEPOSITING AND DISPENSING SYSTEM

TECHNICAL FIELD

The present invention relates to a money depositing device, a money dispensing device, a portable device, and a money depositing and dispensing system.

BACKGROUND ART

Patent Literature (hereinafter, abbreviated as PTL) 1 discloses a money depositing and collecting system in which the depositing amount calculated by a depositing calculation unit or the collected amount calculated on the basis of the depositing amount calculated by the depositing calculation unit is displayed on a depositing and collecting display as code information such as a QR code (Registered Trademark) and a barcode.

CITATION LIST

Patent Literature

PTL 1
Japanese Patent Application Laid-Open No. 2010-204793

SUMMARY OF INVENTION

Technical Problem

Incidentally, in recent years, cost reduction of a money handling device that performs depositing or dispensing of proceeds from sales is desired, and simplification of the depositing management or the dispensing management is desired.

Thus, an object of the present invention is to provide a technology that reduces the cost of a device and simplifies the depositing or dispensing management.

Solution to Problem

A money depositing device of the present invention comprises: a receiving unit that receives depositing instruction information on a depositing instruction from a portable device by wireless communication, the depositing instruction being accepted by the portable device from a user; a depositing processing unit that performs depositing processing of money placed into an inlet by the user in accordance with the depositing instruction information received by the receiving unit; and a transmitting unit that transmits a depositing result of the depositing processing performed by the depositing processing unit to the portable device by wireless communication.

A money dispensing device of the present invention comprises: a receiving unit that receives dispensing instruction information on a dispensing instruction from a portable device by wireless communication, the dispensing instruction being accepted by the portable device from a user; a dispensing processing unit that performs dispensing processing of money stored in a storage unit in accordance with the dispensing instruction information received by the receiving unit; and a transmitting unit that transmits a dispensing result of the dispensing processing performed by the dispensing processing unit to the portable device by wireless communication.

A portable device of the present invention comprises: a transmitting unit that transmits depositing instruction information on a depositing instruction accepted from a user to a money depositing device by wireless communication; a receiving unit that receives a depositing result by wireless communication from the money depositing device that has performed depositing processing of money placed into art inlet by the user in accordance with the depositing instruction information transmitted by the transmitting unit; and a storage that stores therein the depositing result received by the receiving unit.

A portable device of the present invention comprises: a transmitting unit that transmits dispensing instruction information on a dispensing instruction accepted from a user to a money dispensing device by wireless communication; a receiving unit that receives a dispensing result by wireless communication from the money dispensing device that has performed dispensing processing of money stored in a storage unit in accordance with the dispensing instruction information transmitted by the transmitting unit; and a storage that stores therein the dispensing result received by the receiving unit.

A depositing and dispensing system of the present invention comprises: a money depositing device; a money dispensing device; and a portable device, in which: the money depositing device comprises: a depositing receiving unit that receives depositing instruction information on a depositing instruction from a portable device by wireless communication, the depositing instruction being accepted by the portable device from a user; a depositing processing unit that performs depositing processing of money placed into an inlet by the user, in accordance with the depositing instruction information received by the depositing receiving unit; and a depositing transmitting unit that transmits a depositing result of the depositing processing performed by the depositing processing unit to the portable device by wireless communication; the money dispensing device comprises: a dispensing receiving unit that receives dispensing instruction information on a dispensing instruction from the portable device by wireless communication, the dispensing instruction being accepted by the portable device from the user; a dispensing processing unit that performs dispensing processing of money stored in a storage unit, in accordance with the dispensing instruction information received by the dispensing receiving unit; and a dispensing transmitting unit that transmits a dispensing result of the dispensing processing performed by the dispensing processing unit to the portable device by wireless communication; and the portable device comprises a storage that stores therein the depositing result transmitted from the money depositing device or the dispensing result transmitted from the money dispensing device.

Advantageous Effects of Invention

According to the present invention, the cost of the device can be reduced and the depositing or dispensing management can be simplified.

BRIEF DESCRIPTION OF DRAWINGS

FIG. 6 shows a data configuration example of a depositing and dispensing information table stored in a storage;

FIG. 12 shows a data configuration example of the depositing and dispensing information table stored in the storage;

DESCRIPTION OF EMBODIMENT

An embodiment of the present invention is described below with reference to the accompanying drawings.

Figure 1:
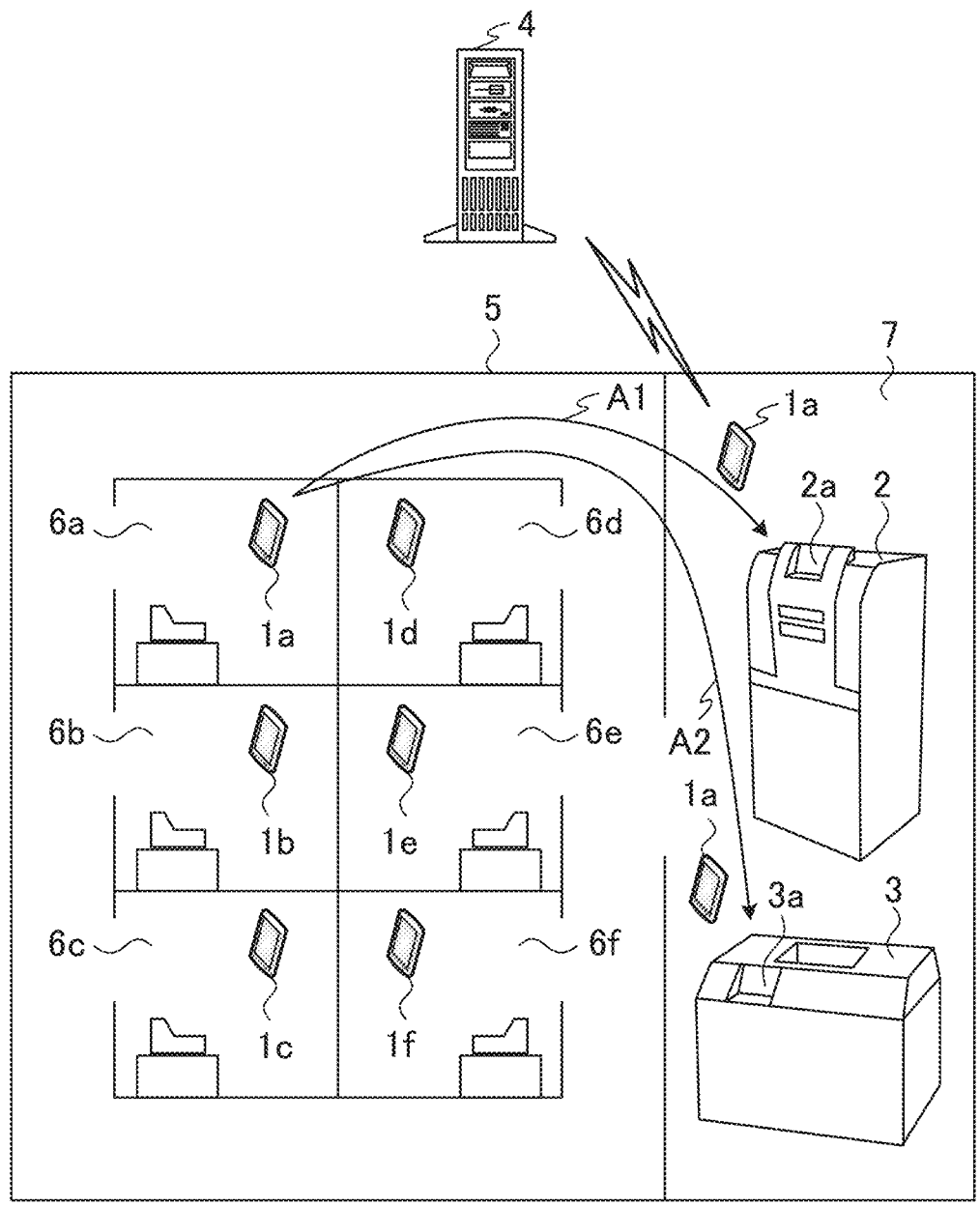
FIG. 1 is a configuration example of a depositing and dispensing system according to one embodiment of the present invention.

FIG. 1 illustrates a configuration example of a depositing and dispensing system according to one embodiment of the present invention. FIG. 1 illustrates a floor 5 of a large shopping mall as an example to which a depositing and dispensing system is applied. Tenants 6a to 6f and a back office 7 are provided on the floor 5. As illustrated in FIG. 1, the money depositing and dispensing system comprises portable devices 1a to 1f, a money depositing device 2, a money dispensing device 3, and a server (higher-level device) 4.

The portable devices 1a to 1f are tablet devices, for example. The portable devices 1a to 1f have a near field radio communication (NFC) function, for example, and perform wireless communication with the money depositing device 2 and the money dispensing device 3.

The portable devices 1a to 1f are managed by the tenants 6a to 6f and are used by employees of the tenants 6a to 6f, respectively. As described below in detail, the employees of the tenants 6a to 6f can perform the depositing operation of the sales and the like of the store on the money depositing device 2 installed in the back office 7 with use of the portable devices 1a to 1f.

As described below in detail, the employees of the tenants 6a to 6f can perform the dispensing operation of the change and the like to be used in the store on the money dispensing device 3 installed in the back office 7 with use of the portable devices 1a to 1f. The employees using the portable devices 1a to 1f may be hereinafter referred to as users.

The money depositing device 2 comprises a placing unit 2a on which the portable devices 1a to 1f are placed. An arrow A1 in FIG. 1 indicates how the portable device 1a of the tenant 6a is going to be placed on the placing unit 2a.

The money depositing device 2 does not comprise an input device and a display for performing the depositing. The portable devices 1a to 1f placed on the placing unit 2a serve as the input device and the display of the money depositing device 2. In other words, the user operates the money depositing device 2 and deposits money in the money depositing device 2 in accordance with the screen displayed on the display of each of the portable devices 1a to 1f.

The money dispensing device 3 comprises a placing unit 3a on which the portable devices 1a to 1f are placed. An arrow A2 indicated in FIG. 1 indicates how the portable device 1a of the tenant 6a is going to be placed on the placing unit 3a.

The money dispensing device 3 does not comprise an input device and a display for performing dispensing. The portable devices 1a to 1f placed on the placing unit 3a serve as the input device and the display of the money dispensing device 3. In other words, the user operates the money dispensing device 3 and take out money from the money dispensing device 3 in accordance with the screen displayed on the display of each of the portable devices 1a to 1f.

The server 4 can communicate with the portable devices 1a to 1f. For example, the server 4 and the portable devices 1a to 1f can communicate with each other with use of networks such as the mobile communication network of a mobile phone and the internet.

The portable devices 1a to 1f transmit information on the depositing performed on the money depositing device 2 by the user to the server 4. The server 4 stores therein the information on the depositing transmitted from the portable devices 1a to 1f.

The portable devices 1a to 1f transmit information on the dispensing performed on the money dispensing device 3 by the user to the server 4. The server 4 stores therein the information on the dispensing transmitted from the portable devices 1a to 1f.

Note that only one money depositing device 2 is illustrated in FIG. 1, but two or more money depositing devices 2 may be installed. In addition, only one money dispensing device 3 is illustrated, but two or more money dispensing devices 3 may be installed. Furthermore, the back office 7 may be provided on a floor that is different from that of the tenants 6a to 6f.

In the example of FIG. 1, the tenants 6a to 6f each have one of the portable devices 1a to 1f, but may each have a plurality of portable devices.

A large shopping mall is given as an example in which the depositing and dispensing system is applied, but the present invention is not limited thereto. For example, the depositing and dispensing system may be applied to a shopping district and the like.

Figure 2:
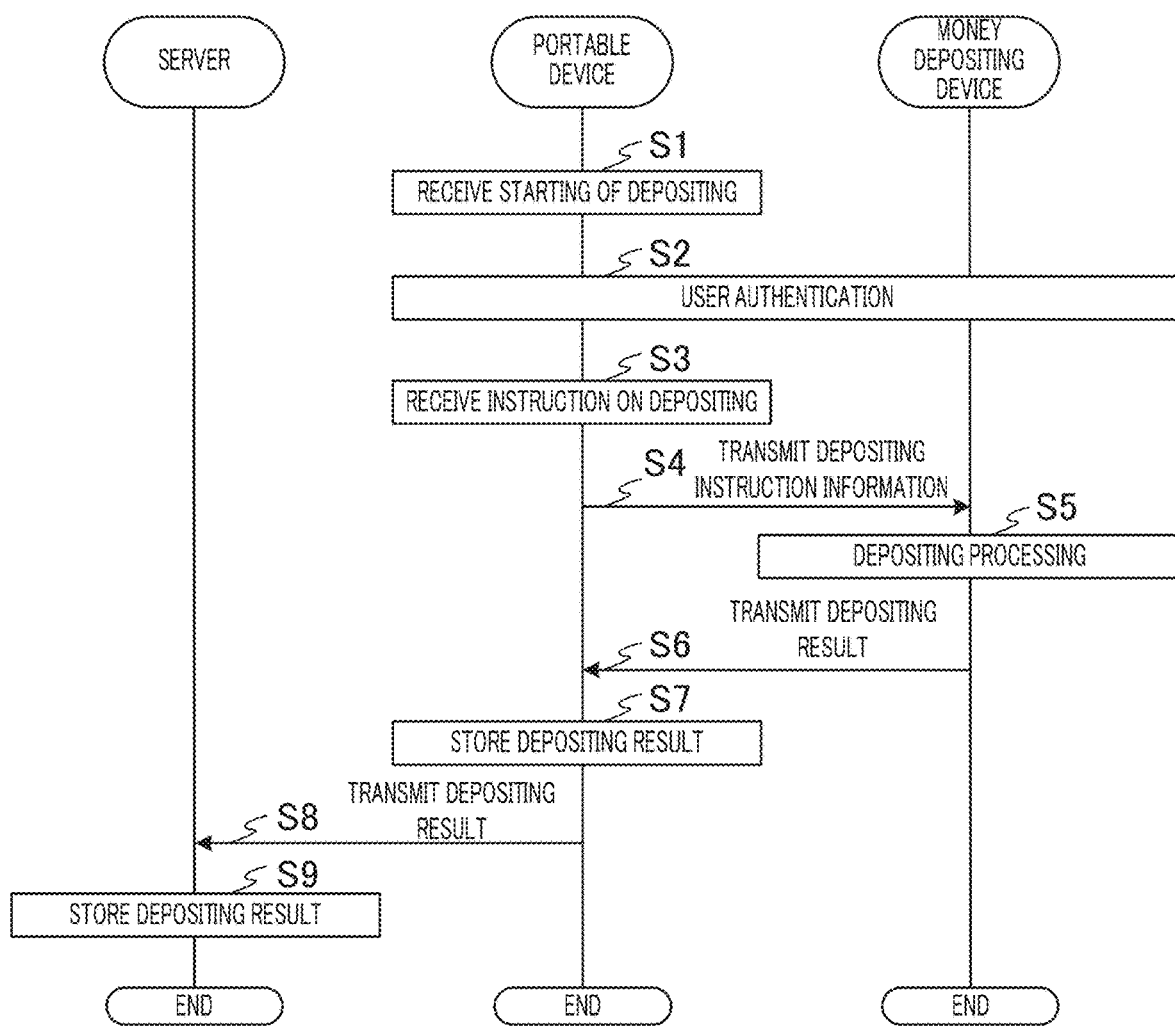
FIG. 2 is a sequence diagram illustrating a schematic operation example of a portable device, a money depositing device, and a server.

FIG. 2 is a sequence diagram illustrating a schematic operation example of the portable device 1a, the money depositing device 2, and the server 4. A schematic operation example when the user of the tenant 6a performs the depositing on the money depositing device 2 with use of the portable device 1a is described below.

First, the portable device 1a accepts the operation for starting the depositing from the user (Step S1).

Next, when the portable device 1a accepts the operation for starting the depositing from the user in Step S1, the portable device 1a displays an instruction screen on the display so that the portable device 1a is placed on the placing unit 2a of the money depositing device 2. When the user places the portable device 1a on the placing unit 2a of the money depositing device 2 in accordance with the instruction screen displayed on the display of the portable device 1a, the portable device 1a and the money depositing device 2 perform user authentication (Step S2).

Note that, when the user authentication m Step S2 is completed, the portable device 1a displays an instruction screen on the display so that the pieces of money are placed in the inlet of the money depositing device 2. The portable device 1a displays a button for instructing the money depositing device 2 to perform the depositing processing.

The user places the pieces of money in the inlet of the money depositing device 2 in accordance with the instruction screen displayed on the display of the portable device 1a. Then, the user presses down the button for instructing the money depositing device 2 to perform the depositing processing displayed on the display of the portable device 1a.

The portable device 1a accepts the instruction on the depositing processing for the money depositing device 2 (the pressing down of the button for instructing the depositing processing) from the user (Step S3).

Next, when the portable device 1a accepts the depositing instruction from the user in Step S3, the portable device 1a transmits depositing instruction information to the money depositing device 2 (Step S4).

Next, when the money depositing device 2 receives the depositing instruction information transmitted in Step S4, the money depositing device 2 performs the depositing processing (Step S5). For example, the money depositing device 2 recognizes the denomination by taking in and conveying the pieces of money placed into the inlet by the user one by one, counts the amount, calculates the total amount, and stores the pieces of money that have been taken in by the money depositing device 2 in the storage unit in the device.

Next, when the depositing processing in Step S5 is completed, the money depositing device 2 transmits the depositing result to the portable device 1a (Step S6). In the depositing result, for example, information on the amount deposited in the money depositing device 2 by the user and the like are included.

Next, when the portable device 1a receives the depositing result transmitted in Step S6, the portable device 1a stores the received depositing result in a storage (Step S7).

Next, when the portable device 1a stores the depositing result in the storage in Step S7, the portable device 1a transmits the depositing result to the server 4 (Step S8).

Next, when the server 4 receives the depositing result transmitted in Step S8, the server 4 stores the received depositing result in a storage (Step S9).

As described above, the portable device 1a is placed on the placing unit 2a of the money depositing device 2, and is in charge of an input and output function of the money depositing device 2. For example, the portable device 1a functions as the display of the money depositing device 2, and functions as a key input device. As a result, the money depositing device 2 does not necessarily need to comprise an input and output device, and the cost can be reduced.

The portable device 1a stores the depositing result of the pieces of money deposited in the money depositing device 2 by the user. As a result, the user can cause the display to display a depositing history stored in the portable device 1a and browse the depositing history without going to the money depositing device 2, for example. The money depositing device 2 does not necessarily need to comprise a storage that stores the information on the depositing therein, and the cost can be reduced.

The portable device 1a transmits the depositing result transmitted from the money depositing device 2 to the server 4. As a result, the money depositing device 2 does not necessarily need to include a communication function for communicating with the server 4, and the cost can be reduced.

The portable device 1a and the money depositing device 2 perform the user authentication. As a result, the portable device 1a and the money depositing device 2 can maintain security at the time of depositing.

Figure 3:
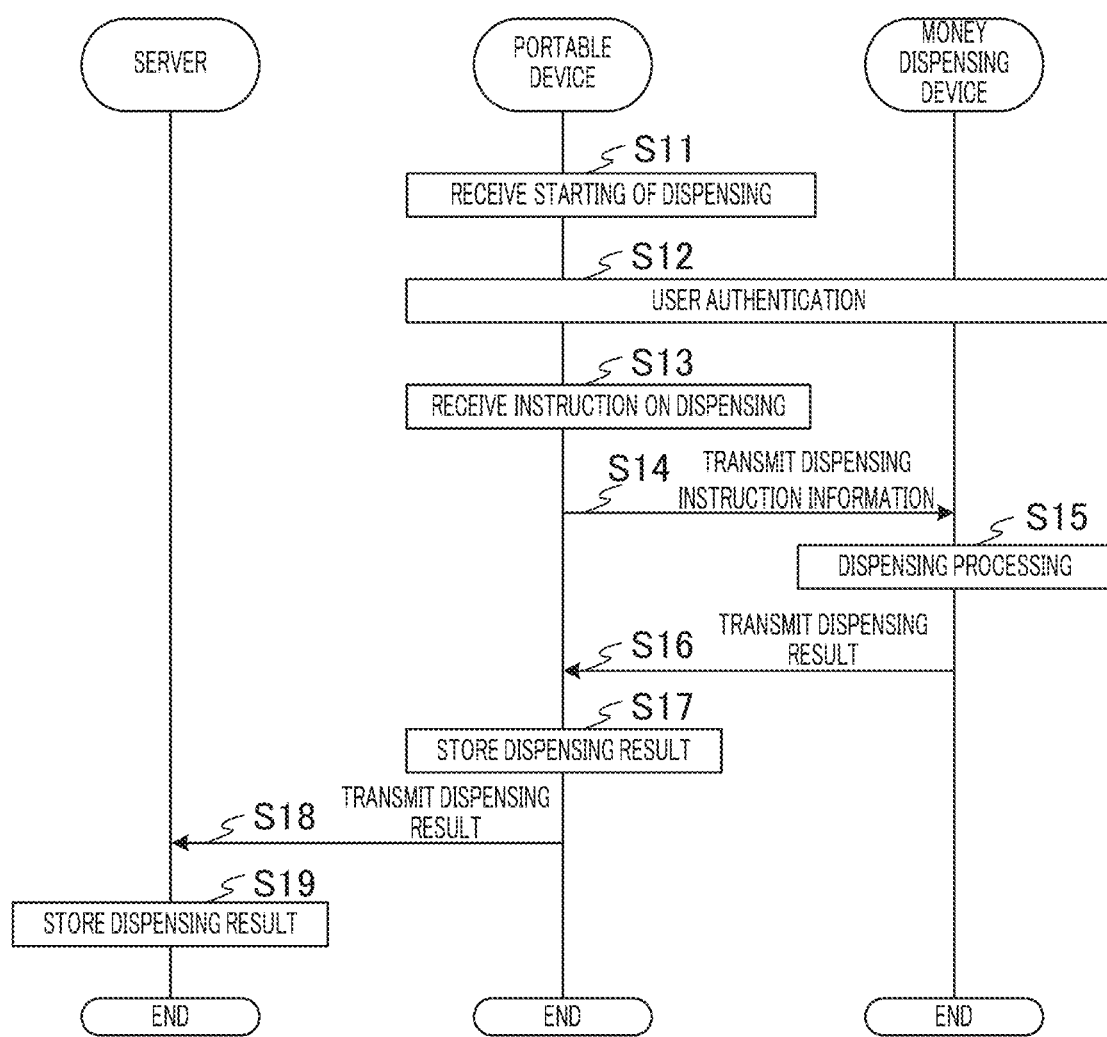
FIG. 3 is a sequence diagram illustrating a schematic operation example of the portable device, a money dispensing device, and the server.

FIG. 3 is a sequence diagram illustrating a schematic operation example of the portable device 1a, the money dispensing device 3, and the server 4. A schematic operation example when the user of the tenant 6a performs dispensing from the money dispensing device 3 with use of the portable device 1a is described below.

First, the portable device 1a accepts the operation for starting the dispensing from the user (Step S11).

Next, when the portable device 1a accepts the operation for starting the dispensing from the user in Step S11, the portable device 1a displays an instruction screen on the display so that the portable device 1a is placed on the placing unit 3a of the money dispensing device 3. When the user places the portable device 1a on the placing unit 3a of the money dispensing device 3 in accordance with the instruction screen displayed on the display of the portable device 1a, the portable device 1a and the money dispensing device 3 perform user authentication (Step S12).

Note that, when the user authentication in Step S12 is completed, the portable device 1a displays a screen for causing the user to input the number of the pieces of money to be dispensed for each denomination on the display. The portable device 1a displays a button for instructing the money dispensing device 3 to perform the dispensing processing on the display.

The user inputs the number of the pieces of money to be dispensed on the screen of the number to be dispensed displayed on the display of the portable device 1a. Then, the user presses down the button for instructing the money dispensing device 3 to perform the dispensing processing.

The portable device 1a accepts the instruction on the dispensing processing for the money dispensing device 3 from the user (Step S13).

Next, when the portable device 1a accepts the dispensing instruction from the user in Step S13, the portable device 1a transmits dispensing instruction information to the money dispensing device 3 (Step S14).

Next, when the money dispensing device 3 receives the dispensing instruction information transmitted in Step S14, the money dispensing device 3 performs the dispensing processing (Step S15). For example, the money dispensing device 3 dispenses the pieces of money stored in the storage unit to the outlet by the dispensed number input to the portable device 1a by the user.

Next, when the dispensing processing in Step S15 is completed, the money dispensing device 3 transmits the dispensing result to the portable device 1a (Step S16). In the dispensing result, information on the amount dispensed to the outlet by the money dispensing device 3 and the like are included, for example.

Next, when the portable device 1a receives the dispensing result transmitted in Step S16, the portable device 1a stores the received dispensing result in the storage (Step S7).

Next, when the portable device 1a stores the dispensing result in the storage in Step S17, the dispensing result is transmitted to the server 4 (Step S18).

Next, when the server 4 receives the dispensing result transmitted in Step S18, the server 4 stores the received dispensing result in the storage (Step S19).

As described above, the portable device 1a is placed on the placing unit 3a of the money dispensing device 3, and is in charge of the input and output function of the money dispensing device 3. For example, the portable device 1a functions as the display of the money dispensing device 3, and functions as the key input device. As a result, the money dispensing device 3 does not necessarily need to comprise an input and output device, and the cost can be reduced.

The portable device 1a stores the dispensing result of the pieces of money dispensed from the money dispensing device 3 for the user. As a result, the user can cause the display to display a dispensing history stored in the portable device 1a and browse the dispensing history without going to the money dispensing device 3, for example. The money dispensing device 3 does not necessarily need to comprise a storage that stores information on the dispensing therein, and the cost can be reduced.

The portable device 1a transmits the dispensing result transmitted from the money dispensing device 3 to the server 4. As a result, the money dispensing device 3 does not necessarily need to comprise a communication function for communicating with the server 4, and the cost can be reduced.

The portable device 1a and the money dispensing device 3 perform user authentication. As a result, the portable device 1a and the money dispensing device 3 can maintain security at the time of the dispensing.

Figure 4:
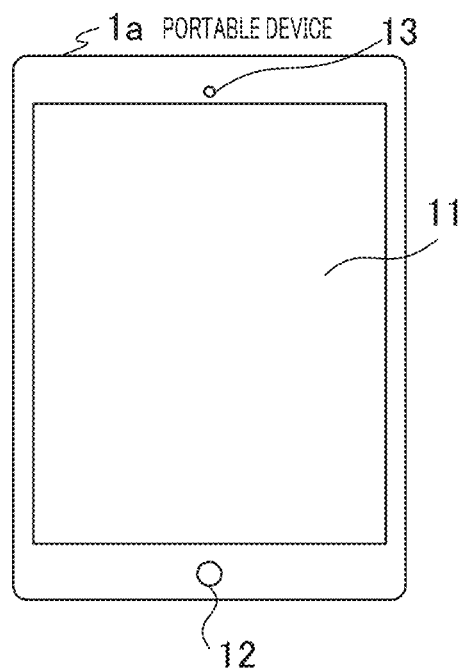
FIG. 4 illustrates an outward appearance example of the portable device.

FIG. 4 illustrates an outward appearance example of the portable device 1a. As illustrated in FIG. 4, the portable device 1a comprises a display 11, a fingerprint reading device 12, and an imaging device 13. Note that the other portable devices 1b to 1f also have a similar outward appearance as that of the portable device 1a.

Figure 5:
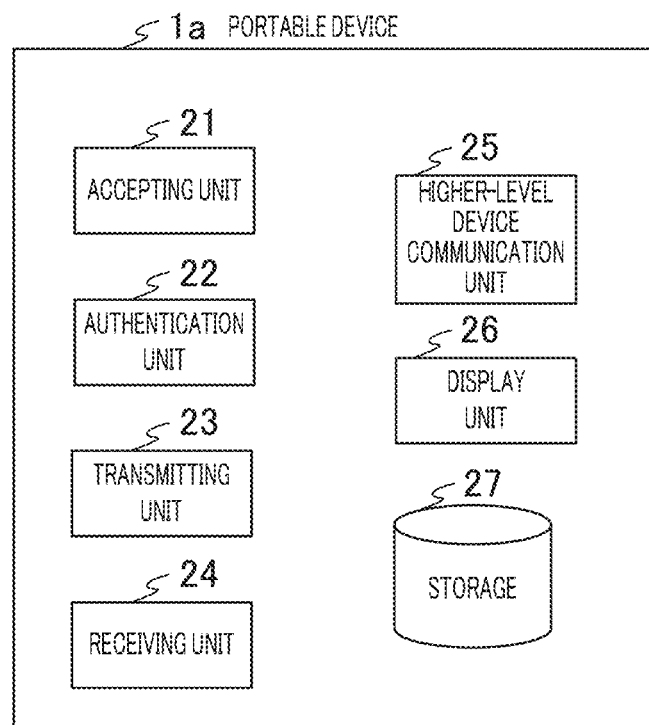
FIG. 5 illustrates a function block example of the portable device.

FIG. 5 illustrates a function block example of the portable device 1a. As illustrated in FIG. 5, the portable device 1a comprises an accepting unit 21, an authentication unit 22, a transmitting unit 23, a receiving unit 24, a higher-level device communication unit 25, a display unit 26, and a storage 27. Note that the other portable devices 1b to 1f also have similar function blocks as those of the portable device 1a, and the description thereof is omitted.

The accepting unit 21 accepts information on the operation performed on the portable device 1a by the user. For example, a transparent touch panel is provided on the upper surface of the display 11 of the portable device 1a, and the accepting unit 21 accepts information on the operation on the touch panel performed by the user.

The authentication unit 22 performs authentication processing of the user that can perform depositing on the money depositing device 2. The authentication unit 22 performs the authentication processing of the user that can perform dispensing on the money dispensing device 3.

For example, the authentication unit 22 transmits the fingerprint information read by the fingerprint reading device 12 to the money depositing device 2. When the money depositing device 2 stores therein the fingerprint information that matches with the fingerprint information transmitted from the authentication unit 22, the money depositing device 2 returns information indicating that the user authentication is successful to the authentication unit 22. When the authentication unit 22 receives information indicating that the user authentication is successful from the money depositing device 2, the authentication unit 22 proceeds with the processing of the depositing procedure.

Note that the authentication unit 22 may perform the user authentication on the basis of face image data of the user imaged by the imaging device 13. For example, the authentication unit 22 transmits the face image data of the user imaged by the imaging device 13 to the money depositing device 2. When the money depositing device 2 stores therein the face image data that matches with the face image data transmitted from the authentication unit 22, the money depositing device 2 returns information indicating that the user authentication is successful to the authentication unit 22. When the authentication unit 22 receives information indicating that the user authentication is successful from the money depositing device 2, the authentication unit 22 proceeds with the processing of the depositing procedure. The authentication unit 22 performs the user authentication by the fingerprint authentication below.

The transmitting unit 23 transmits information to the money depositing device 2 by wireless communication. For example, the transmitting unit 23 transmits information to the money depositing device 2 by NFC.

The transmitting unit 23 transmits information to the money dispensing device 3 by wireless communication. For example, the transmitting unit 23 transmits information to the money dispensing device 3 by NFC.

The receiving unit 24 receives the information transmitted from the money depositing device 2 by wireless communication. For example, the receiving unit 24 receives the information transmitted from the money depositing device 2 by NFC.

The receiving unit 24 receives the information transmitted from the money dispensing device 3 by wireless communication. For example, the receiving unit 24 receives the information transmitted from the money dispensing device 3 by NFC.

The higher-level device communication unit 25 communicates with the server 4. For example, the higher-level device communication unit 25 communicates with the server 4 with use of networks such as the mobile communication network of a mobile phone and the internet.

The display unit 26 displays predetermined information on the display 11.

In the storage 27, the depositing information indicating that the pieces of money are deposited in the money depositing device 2 is stored. In the storage 27, the dispensing information indicating that the pieces of money are dispensed from the money dispensing device 3 is stored.

Note that the functions of the accepting unit 21, the authentication unit 22, and the display unit 26 are realized by a central processing unit (CPU), for example. The functions of the transmitting unit 23, the receiving unit 24, and the higher-level device communication unit 25 are realized by communication devices such as a wireless interface device, for example. The function of the storage 27 is realized by a memory, for example.

FIG. 6 shows a data configuration example of a depositing and dispensing information table 27a stored in the storage 27. The depositing and dispensing information table 27a shown in FIG. 6 is stored in the storage 27.

The depositing and dispensing information table 27a includes information on "transaction starting date and time" at which the depositing or the dispensing has been performed, and information on "transaction ending date and time" at which the depositing or the dispensing has ended.

The depositing and dispensing information table 27a includes information on "store identification code" with which the tenants 6a to 6f (stores) are identified, and information on "processing content" performed by the users. The processing content performed by the user includes change dispensing and depositing.

The depositing and dispensing information table 27a includes information on "operator ID" of the users that have performed the depositing or the dispensing processing, and information on "portable device number" with which the portable device used at the time of the depositing or the dispensing is identified. The depositing and dispensing information table 27a includes information on "processing device number" with which the processing devices (the money depositing device 2 and the money dispensing device 3) that have performed the depositing processing are identified.

The depositing and dispensing information table 27a includes information on the "number of denominations" for each denomination of the pieces of money deposited in the money depositing device 2, and information on the "number of denominations" for each denomination of the pieces of money dispensed from the money dispensing device 3. The depositing and dispensing information table 27a includes information on the "total amount" of the pieces of money deposited in the money depositing device 2 and information on the "total amount" of the pieces of money dispensed from the money dispensing device 3.

As described in Step S6 in FIG. 2, when the depositing processing is completed, the money depositing device 2 transmits the depositing result to the portable device 1a. The depositing result transmitted from the money depositing device 2 includes the "transaction starting date and time" at which the depositing has started and the "transaction ending date and time" at which the depositing has ended. The depositing result also includes the "store identification code" of the store (tenant) that has performed the depositing, the "processing content" indicating that the depositing processing has been performed, the "operator ID" of the user that has performed the depositing, the "portable device number" of the portable device used by the user at the time of the depositing, and the "processing device number" of the money depositing device 2 on which the user has performed the depositing. The depositing result also includes information on the "number of denominations" for each denomination of the pieces of money deposited in the money depositing device 2 and the "total amount". The receiving unit 24 of the portable device 1a stores the information included in the depositing result received from the money depositing device 2 to the depositing and dispensing information table 27a.

As described in Step S16 in FIG. 3, when the dispensing processing is completed, the money dispensing device 3 transmits the dispensing result to the portable device 1a. The dispensing result transmitted from the money dispensing device 3 includes the "transaction starting date and time" at which the dispensing has started and the "transaction ending date and time" at which the dispensing has ended. The dispensing result also includes the "store identification code" of the store (tenant) that has performed the dispensing, the "processing content" indicating that the dispensing processing has been performed, the "operator ID" of the user that has performed the dispensing, the "portable device number" of the portable device used by the user at the time of the dispensing, and the "processing device number" of the money dispensing device 3 on which the user has performed the dispensing. The dispensing result also includes information on the "number of denominations" for each denomination of the pieces of money dispensed from the money dispensing device 3 and the "total amount". The receiving unit 24 of the portable device 1a stores the information included in the dispensing result received from the money dispensing device 3 in the depositing and dispensing information table 27a.

Figure 7:
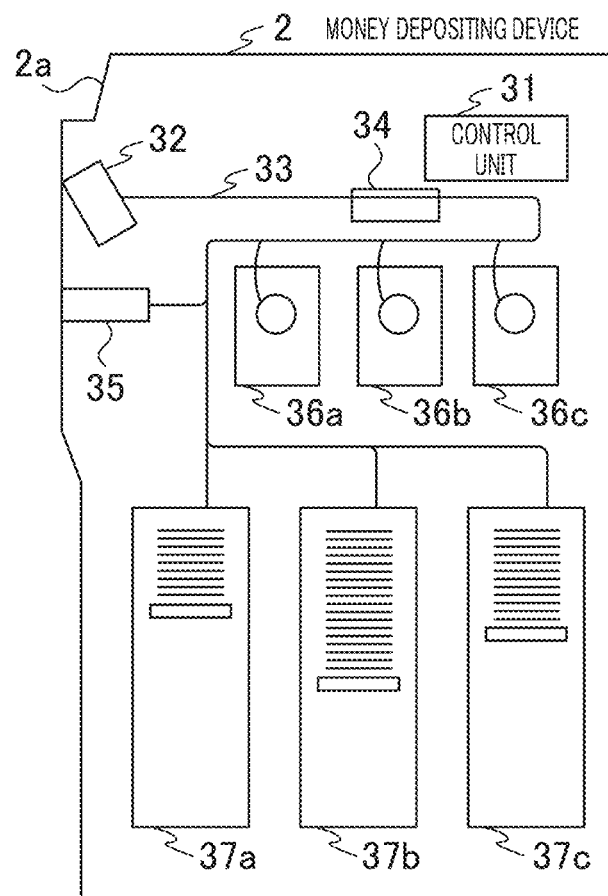
FIG. 7 illustrates a schematic inner configuration example of the money depositing device.

FIG. 7 illustrates a schematic inner configuration example of the money depositing device 2. As illustrated in FIG. 7, the money depositing device 2 comprises a control unit 31, an inlet 32, a transport unit 33, a recognition unit 34, a rejection port 35, temporary storage units 36a to 36c, and storage units 37a to 37c. Note that the placing unit 2a on which the portable devices 1a to 1f are placed described in FIG. 1 is also illustrated in the money depositing device 2 in FIG. 7.

The control unit 31 controls the entire apparatus of the money depositing device 2. For example, the control unit 31 controls the depositing processing of the money depositing device 2.

Pieces of money are placed into the inlet 32. The pieces of money placed into the inlet 32 are banknotes of 1,000 yen, 5,000 yen, and 10,000 yen, for example. The pieces of money placed into the inlet 32 are conveyed to the rejection port 35, the temporary storage units 36a to 36c, or the storage units 37a to 37c by the transport unit 33.

The recognition unit 34 is provided between the inlet 32 and the temporary storage units 36a to 36c on the transport unit 33. The recognition unit 34 recognizes the authenticity, the fitness, the denomination, the number, and the like of the pieces of money placed into the inlet 32.

The pieces of money placed into the inlet 32 are conveyed to the rejection port 35, the temporary storage units 36a to 36c, or the storage units 37a to 37c in accordance with the recognition result of the recognition unit 34. For example, counterfeit banknotes and banknotes that cannot be recognized are conveyed to the rejection port 35.

The temporary storage units 36a to 36c temporarily store the pieces of money placed into the inlet 32 therein. The pieces of money are temporarily stored in the temporary storage units 36a to 36c according to denomination.

When the amount of money deposited and temporarily stored in the temporary storage units 36a to 36c are accepted (confirmed) by the user, the pieces of money temporarily stored in the temporary storage units 36a to 36c are conveyed to and are stored in the storage units 37a to 37c. The pieces of money are stored in the storage units 37a to 37c according to denomination.

Figure 8:
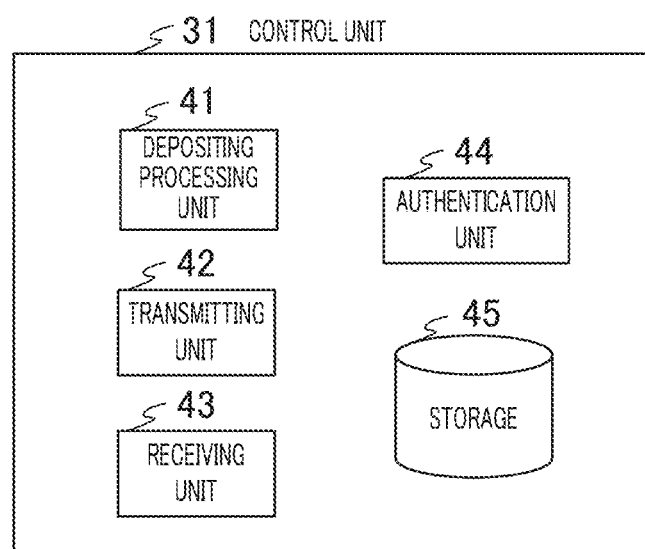
FIG. 8 illustrates a function block example of a control unit of the money depositing device.

FIG. 8 illustrates a function block example of the control unit 31 of the money depositing device 2. As illustrated in FIG. 8, the control unit 31 comprises a depositing processing unit 41, a transmitting unit 42, a receiving unit 43, an authentication unit 44, and a storage 45.

The depositing processing unit 41 performs the depositing processing of the money depositing device 2. For example, the depositing processing unit 41 conveys the pieces of money placed into the inlet 32 to the recognition unit 34 by controlling the transport unit 33. Then, the depositing processing unit 41 counts the number of the pieces of money placed into the inlet 32 for each denomination on the basis of the recognition result of the recognition unit 34, and calculates the total amount of money placed into the inlet 32. The depositing processing unit 41 acquires the transaction starting date and time at which the depositing transaction has started and the transaction ending date and time at which the depositing transaction has ended from a Real-Time Clock (RTC, not shown), for example.

The depositing processing unit 41 transmits the depositing result including information on the transaction starting date and time, information on the transaction ending date and time, the processing content indicating the depositing processing, information on the portable device number used by the user, information on the processing device number with which the money depositing device 2 is identified, information on the number of the pieces of money for each denomination placed into the inlet 32, and information on the total amount to the portable device 1*a* via the transmitting unit 42. The depositing processing unit 41 transmits the depositing result to the portable device 1*a* in a CSV format, for example.

The transmitting unit 42 transmits information (data) to the portable devices 1*a* to 1*f* placed on the placing unit 2*a* by wireless communication. For example, the transmitting unit 42 transmits information to the portable devices 1*a* to 1*f* placed on the placing unit 2*a* by NFC.

The receiving unit 43 receives information from the portable devices 1*a* to 1*f* placed on the placing unit 2*a* by wireless communication. For example, the receiving unit 43 receives information from the portable devices 1*a* to 1*f* placed on the placing unit 2*a* by NFC.

The authentication unit 44 performs the authentication processing of the user depositing the money depositing device 2. For example, the authentication unit 44 receives the fingerprint information on the user transmitted from the portable devices 1*a* to 1*f*, and matches the fingerprint information with the fingerprint information stored in the storage 45 in advance. When the fingerprint information transmitted from the portable devices 1*a* to 1*f* and the fingerprint information stored in the storage 45 in advance matches with each other (for example, when the two items of fingerprint information matches with each other at a predetermined threshold value or more), the authentication unit 44 determines that the user authentication is successful. Then, the authentication unit 44 transmits the authentication result to the portable devices 1*a* to 1*f* via the transmitting unit 42.

In the storage 45, the fingerprint information for performing the user authentication is stored in advance. The fingerprint information is associated with the user information and is stored in the storage 45. For example, the fingerprint information is associated with the "store identification code" of the store to which the user belongs and the "operator ID" with which the user is identified, and is stored in the storage 45. As a result, when the depositing result is transmitted to the portable devices 1*a* to 1*f*, the depositing processing unit 41 can acquire the "store identification code" to which the user that has performed the depositing belongs and the "operator ID" from the storage 45, and transmit the "store identification code" and the "operator ID" by including the "store identification code" and the "operator ID" in the depositing result.

Note that the functions of the depositing processing unit 41 and the authentication unit 44 are realized by a CPU, for example. The functions of the transmitting unit 42 and the receiving unit 43 are realized by a communication apparatus such as a wireless interface device, for example. The function of the storage 45 is realized by a memory, for example.

Figure 9:
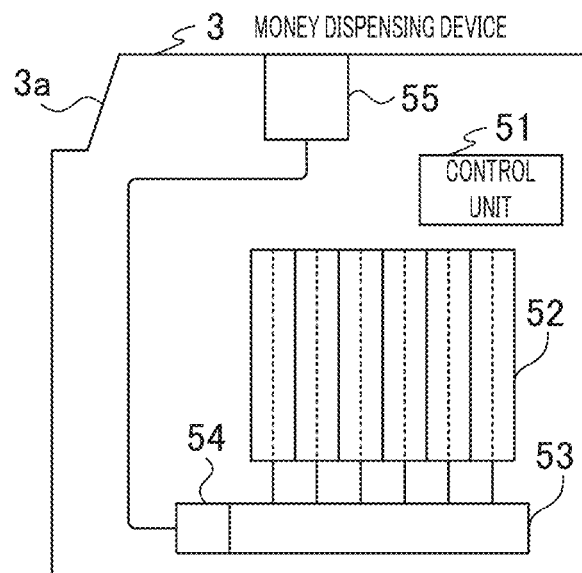
FIG. 9 illustrates a schematic inner configuration example of the money dispensing device.

FIG. 9 illustrates a schematic inner configuration example of the money dispensing device 3. As illustrated in FIG. 9, the money dispensing device 3 comprises a control unit 51, a storage unit 52, a transport unit 53, a recognition unit 54, and an outlet 55. Note that the placing unit 3*a* on which the portable devices 1*a* to 1*f* are placed described in FIG. 1 is also illustrated in the money dispensing device 3 in FIG. 9.

The control unit 51 controls the entire device of the money dispensing device 3. For example, the control unit 51 controls the dispensing processing of the money dispensing device 3.

The pieces of money to be dispensed from the outlet 55 are stored in the storage unit 52. The pieces of money to be stored in the storage unit 52 are change (coins) to be used in the tenants 6*a* to 6*f*, for example. The pieces of money are stored in the storage unit 52 according to denomination.

The transport unit 53 conveys the pieces of money to be dispensed from the storage unit 52 to the outlet 55. The recognition unit 54 recognizes the denomination, the number, and the like of the pieces of money to be dispensed from the outlet 55 by the transport unit 53.

Figure 10:
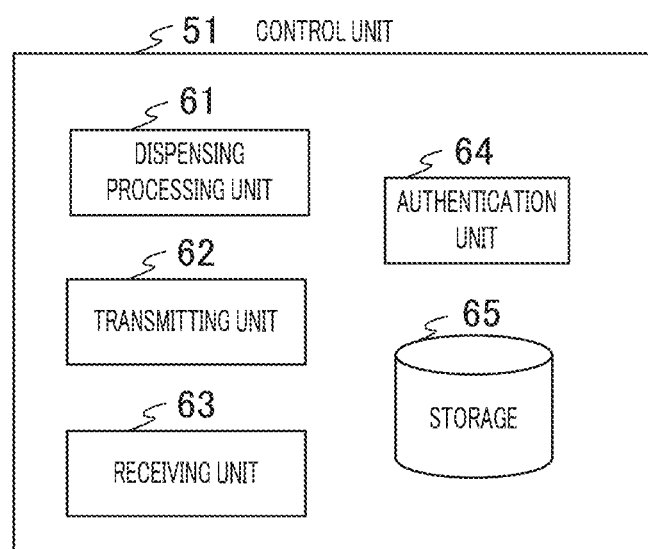
FIG. 10 illustrates a function block example of a control unit of the money dispensing device.

FIG. 10 illustrates a function block example of the control unit 51 of the money dispensing device 3. As illustrated in FIG. 10, the control unit 51 comprises a dispensing processing unit 61, a transmitting unit 62, a receiving unit 63, an authentication unit 64, and a storage 65.

The dispensing processing unit 61 performs the dispensing processing of the money dispensing device 3. For example, the dispensing processing unit 61 feeds out the pieces of money to be dispensed from the outlet 55, from the storage unit 52. At this time, the dispensing processing unit 61 feeds out the pieces of money from the storage unit 52 by the denomination instructed from the portable devices 1*a* to 1*f* and by the number instructed from the portable devices 1*a* to 1*f*. The dispensing processing unit 61 acquires the transaction starting date and time at which the dispensing transaction has started and the transaction ending date and time at which the dispensing transaction has ended from a RTC (not shown), for example.

The dispensing processing unit 61 transmits the dispensing result including information on the transaction starting date and time, information on the transaction ending date and time, the processing content indicating the dispensing processing, information on the portable device number used by the user, information on the processing device number with which the money dispensing device 3 is identified, information on the number of the pieces of money for each denomination dispensed from the outlet 55, and information on the total amount to the portable device 1*a* via the transmitting unit 62. The dispensing processing unit 61 transmits the dispensing result to the portable device 1*a* in a CSV format, for example.

The transmitting unit 62 transmits information (data) to the portable devices 1*a* to 1*f* placed on the placing unit 3*a* by wireless communication. For example, the transmitting unit 62 transmits information to the portable devices 1*a* to 1*f* placed on the placing unit 3*a* by NFC.

The receiving unit 63 receives information from the portable devices 1*a* to 1*f* placed on the placing unit 3*a* by wireless communication. For example, the receiving unit 63 receives information from the portable devices 1*a* to 1*f* placed on the placing unit 3*a* by NFC.

The authentication unit 64 performs the authentication processing of the user taking the pieces of money out from the money dispensing device 3. The operation of the authentication unit 64 is similar to that of the authentication unit 44 described in FIG. 8, and the description thereof is omitted.

In the storage 65, the fingerprint information for performing the user authentication is stored in advance. The storing of the fingerprint information in the storage 65 is similar to that of the storage 45, and the description thereof is omitted. Note that, when the dispensing result is transmitted to the portable devices 1*a* to 1*f*, the dispensing processing unit 61 acquires the "store identification code" to which the user that has performed the dispensing belongs and the "operator ID" from the storage 65, and transmits the "store identification code" and the "operator ID" by including the "store identification code" and the "operator ID" in the dispensing result.

Note that the functions of the dispensing processing unit 61 and the authentication unit 64 are realized by a CPU, for example. The functions of the transmitting unit 42 and the receiving unit 43 are realized by a communication device such as a wireless interface apparatus, for example. The function of the storage 65 is realized by a memory, for example.

Figure 11:
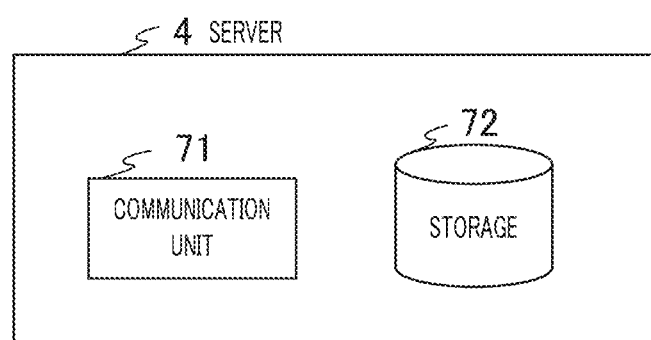
FIG. 11 illustrates a function block example of the server.

FIG. 11 illustrates a function block example of the server 4. As illustrated in FIG. 11, the server 4 comprises a communication unit 71 and a storage 72.

The communication unit 71 communicates with the portable devices 1a to 1f. For example, the communication unit 71 communicates with the portable devices 1a to 1f with use of networks such as the mobile communication network of a mobile phone and the internet.

The depositing result and the dispensing result transmitted from the portable devices 1a to 1f are stored in the storage 72.

Note that the function of the communication unit 71 is realized by a communication device such as a network interface device, for example. The function of the storage 72 is realized by a memory, for example.

FIG. 12 shows a data configuration example of a depositing and dispensing information table 72a stored in the storage 72. The depositing and dispensing information table 72a includes information similar to that of the depositing and dispensing information table 27a described in FIG. 6. However, the depositing and dispensing information table 72a is different from the depositing and dispensing information table 27a described in FIG. 6 in that the depositing and dispensing information table 72a includes the depositing and dispensing results of the depositing and the dispensing performed by the tenants 6a to 6f. In other words, the information on the depositing and the dispensing of the tenants 6a to 6f illustrated in FIG. 1 is stored in the depositing and dispensing information table 72a of the server 4.

Figure 13A:
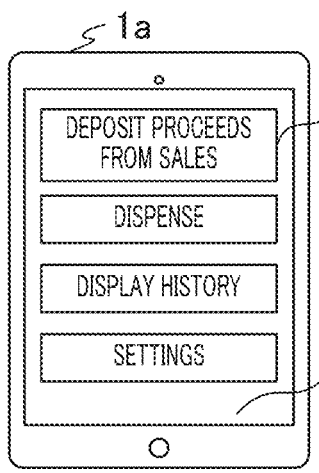
FIGS. 13A to 13G illustrate a screen transition example of the portable device at the time of depositing.

FIGS. 13A to 13G illustrate a screen transition example of the portable device 1a at the time of depositing. The user taps the icon of a depositing and dispensing application displayed on the display 11 of the portable device 1a in order to deposit the proceeds from sales and the like into the money depositing device 2. Then, the screen illustrated in FIG. 13A is displayed on the display 11 of the portable device 1a.

The user presses down a button 81a displayed as "deposit proceeds from sales" illustrated in FIG. 13A in order to perform depositing on the money depositing device 2.

Figure 13B:
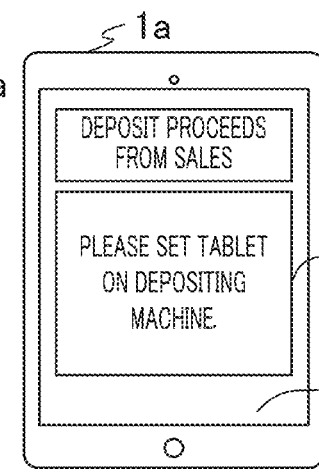

Then, as illustrated in FIG. 13B, a screen 81b instructing the portable device 1a to be placed on the placing unit 2a of the money depositing device 2 is displayed on the display 11 of the portable device 1a.

The user places the portable device 1a on the placing unit 2a of the money depositing device 2 in accordance with the screen 81b displayed in FIG. 13B. Then, as illustrated in FIG. 13C, a screen 81c that instructs an authentication procedure to be performed is displayed on the display 11 of the portable device 1a.

Figure 13C:
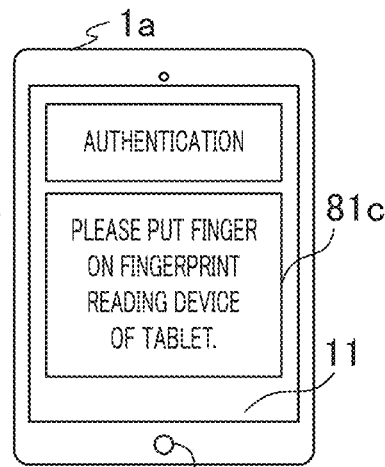
Figure 13D:
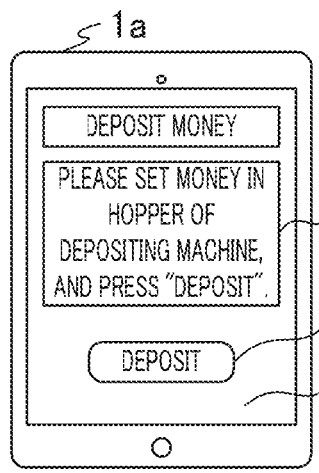

The user causes the fingerprint reading device 12 to read the fingerprint in accordance with the screen 81c illustrated in FIG. 13C. As illustrated in FIG. 13D, when the user authentication by the fingerprint authentication is successful, the portable device 1a displays a screen 81d that instructs the pieces of money to be set in the hopper (inlet 32) of the money depositing device 2 on the display 11. As illustrated in FIG. 13D, the portable device 1a displays a button 81e displayed as "deposit" on the display 11.

Figure 13E:
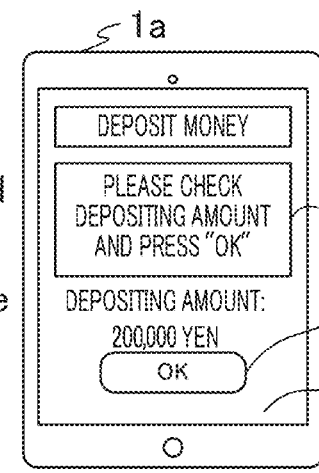

As illustrated in FIG. 13E, when the user places the pieces of money into the inlet 32 and presses down the button 81e displayed as "deposit", the portable device 1a displays a screen 81f instructing the confirmation of the depositing amount on the display 11. As illustrated m FIG. 13E, the portable device 1a displays a button 81g displayed as "OK" on the display 11.

Figure 13F:
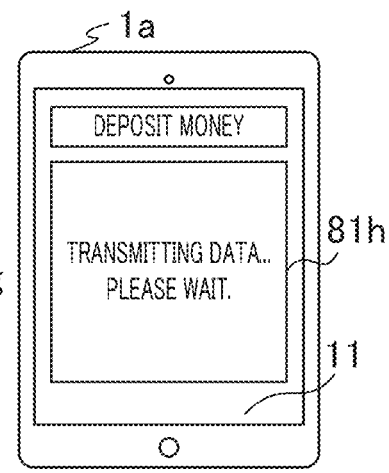

As illustrated in FIG. 13F, when the user confirms the depositing amount displayed on the display 11 and presses down the button 81g displayed as "OK", the portable device 1a displays a screen 81h indicating that the data is being transmitted on the display 11.

Figure 13G:
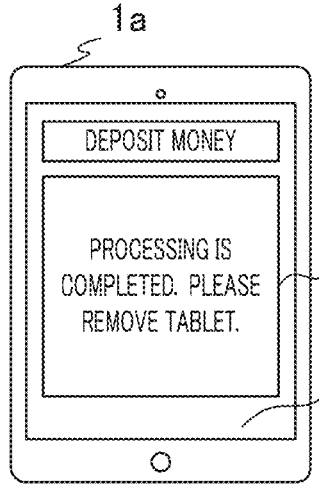

As illustrated in FIG. 13G, when the data transmission is completed, the portable device 1a displays a screen 81i indicating that the depositing processing is completed on the display 11.

FIG. 14 illustrates a screen transition example of the portable device 1a at the time of dispensing. The user taps the icon of the depositing and dispensing application displayed on the display 11 of the portable device 1a in order to take the pieces of money to be used as the change and the like out from the money dispensing device 3. Then, a screen illustrated in FIG. 14A is displayed on the display 11 of the portable device 1a.

Figure 14A:
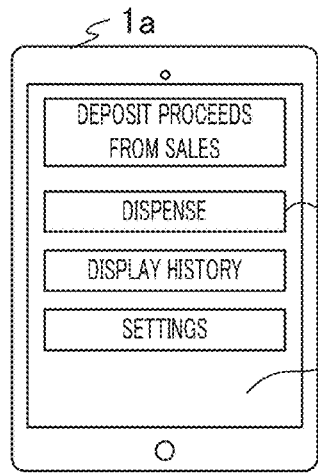
FIGS. 14A to 14F illustrate a screen transition example of the portable device at the time of dispensing.

The user presses down a button 82a displayed as "dispense" illustrated in FIG. 14A in order to take the pieces of money out from the money dispensing device 3.

Figure 14B:
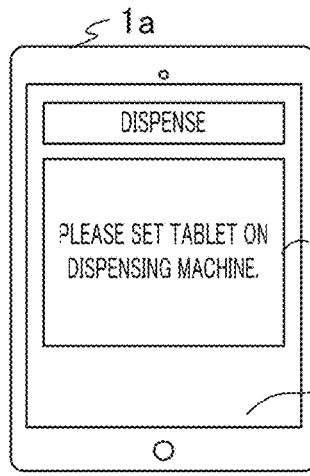

Then, as illustrated m FIG. 14B, a screen 82b that instructs the portable device 1a to be placed on the placing unit 3a of the money dispensing device 3 is displayed on the display 11 of the portable device 1a.

The user places the portable device 1a on the placing unit 3a of the money dispensing device 3 in accordance with the screen 82b illustrated in FIG. 14B. Then, as illustrated m FIG. 14C, a screen 82c that instructs the authentication procedure to be performed is displayed on the display 11 of the portable device 1a.

Figure 14C:
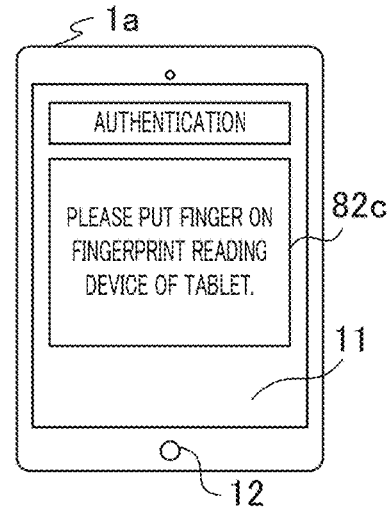
Figure 14D:
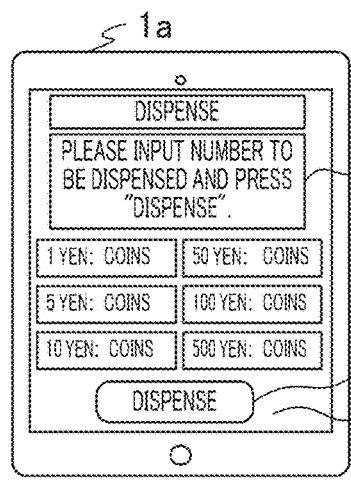

The user causes the fingerprint reading device 12 to read the fingerprint in accordance with the screen 82c illustrated in FIG. 14C. As illustrated in FIG. 14D, when the user authentication by the fingerprint authentication is successful, the portable device 1a displays a screen 82d that instructs the number to be dispensed for each denomination to be input on the display 11. As illustrated in FIG. 14D, the portable device 1a displays a button 82e displayed as "dispense" on the display 11.

Figure 14E:
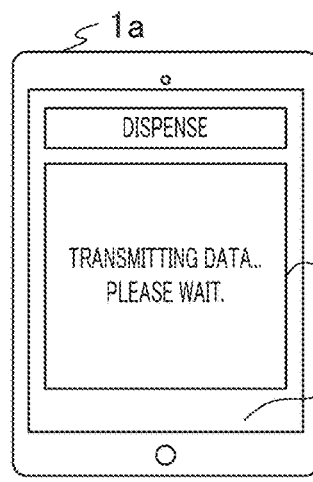

As illustrated in FIG. 14E, when the user inputs the number to be dispensed for each denomination in the portable device 1a and presses down the button 82e displayed as "dispense", the portable device 1a displays a screen 82f indicating that the data is being transmitted on the display 11.

Figure 14F:
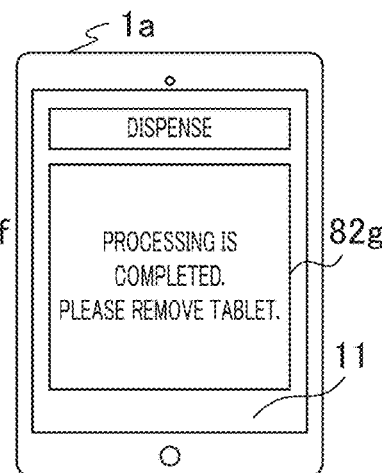

As illustrated in FIG. 14F, when the data transmission is completed, the portable device 1a displays a screen 82g indicating that the dispensing processing is completed on the display 11.

Figure 15:
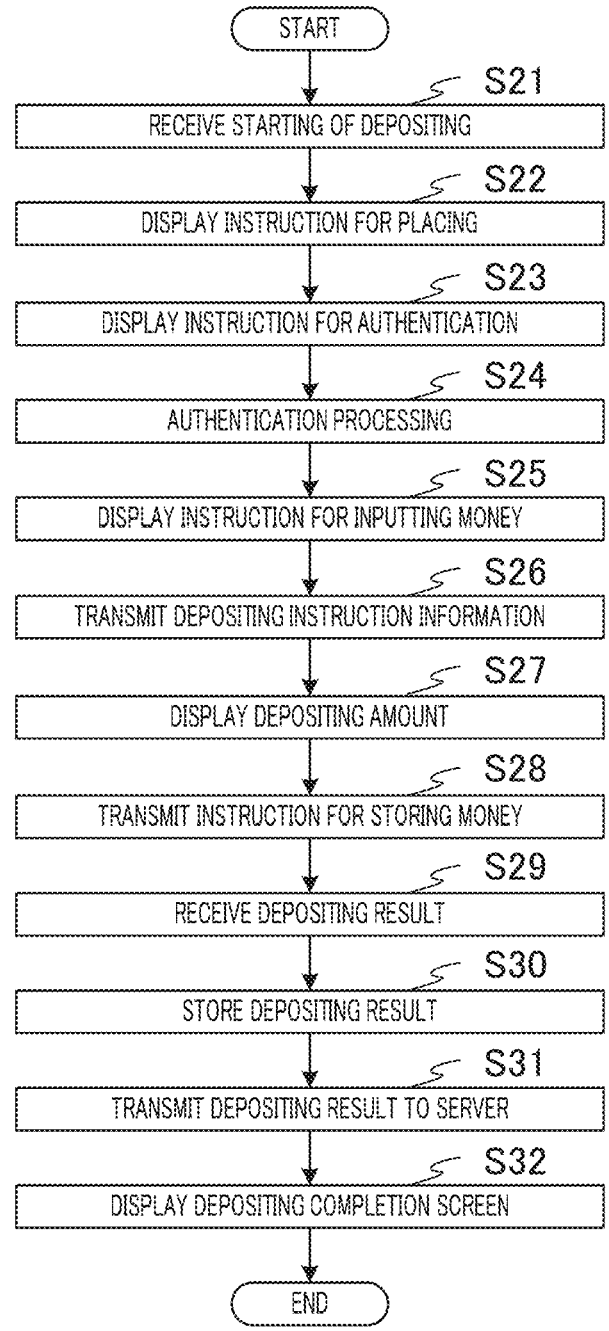
FIG. 15 is a flowchart illustrating an operation example in depositing processing of the portable device.

FIG. 15 is a flowchart illustrating the operation example in the depositing processing of the portable device 1a.

First, the accepting unit 21 accepts the operation for starting the depositing from the user (Step S21). For example, the accepting unit 21 accepts the operation of pressing down the button 81a illustrated in FIG. 13A.

Next, the display unit 26 displays a screen instructing the portable device 1*a* to be placed on the placing unit 2*a* on the display 11 in response to the acceptance of the depositing starting operation in Step S21 (Step S22). For example, the display unit 26 displays the screen 81*b* illustrated in FIG. 13B on the display 11.

Next, when it is confirmed that the portable device 1*a* is placed on the placing unit 2*a*, the display unit 26 displays a screen that instructs the user to perform the user authentication on the display 11 (Step S23). For example, the display unit 26 displays the screen 81*c* illustrated in FIG. 13C on the display 11.

Next, the authentication unit 22 performs the authentication processing of the user (Step S24). For example, the authentication unit 22 transmits the fingerprint information on the user read by the fingerprint reading device 12 to the money depositing device 2, and receives the authentication result from the money depositing device 2.

Next, when the user authentication ends, the display unit 26 displays a screen that instructs the pieces of money to be placed in the inlet 32 on the display 11 (Step S25). For example, the display unit 26 displays the screen 81*d* illustrated in FIG. 13D on the display 11.

Next, when the accepting unit 21 accepts the depositing instruction from the user, the transmitting unit 23 transmits the depositing instruction information to the money depositing device 2 (Step S26). For example, when the accepting unit 21 accepts the operation of pressing down the button 81*e* illustrated in FIG. 13D, the transmitting unit 23 transmits the depositing instruction information to the money depositing device 2.

Note that, when the depositing instruction information is transmitted from the portable device 1*a*, the control unit 31 of the money depositing device 2 causes the pieces of money placed into the inlet 32 to be recognized by the recognition unit 34, and counts the number of the pieces of money placed into the inlet 32 for each denomination and the amount thereof. Then, the control unit 31 of the money depositing device 2 transmits the counted amount to the portable device 1*a*. The pieces of money, the amount of which is counted, are temporarily stored m the temporary storage units 36*a* to 36*c*.

Next, the display unit 26 displays the depositing amount transmitted from the money depositing device 2 on the display 11 (Step S27). For example, as illustrated in FIG. 13E, the display unit 26 displays the depositing amount on the display 11.

Next, when the accepting unit 21 accepts the confirmation of the depositing amount from the user, the transmitting unit 23 transmits the instruction for storing the pieces of money to the money depositing device 2 (Step S28). For example, when the button 81*g* illustrated m FIG. 13E is pressed down, the transmitting unit 23 transmits the instruction for storing the pieces of money to the money depositing device 2.

Note that, when the control unit 31 of the money depositing device 2 receives the storing instruction from the portable device 1*a*, the control unit 31 stores the pieces of money temporarily stored in the temporary storage units 36*a* to 36*c* in the storage units 37*a* to 37*c*. Then, the control unit 31 of the money depositing device 2 transmits the depositing result including the information described in FIG. 6 to the portable device 1*a*.

Next, the receiving unit 24 receives the depositing result from the money depositing device 2 (Step S29).

Next, the storage 27 stores the depositing result received in Step S28 therein (Step S30). As a result, in the storage 27, a depositing and dispensing table 27*a* as that shown in FIG. 6 is formed.

Next, the higher-level device communication unit 25 transmits the depositing result received in Step S28 to the server 4 (Step S31). Note that the server 4 stores the depositing result transmitted from the portable device 1*a* to the storage 72. As a result, in the storage 72 of the server 4, a depositing and dispensing information table 72*a* as that shown in FIG. 12 is formed.

Next, when the transmission of the depositing result to the server 4 in Step S30 is completed, the display unit 26 displays a screen indicating that the depositing is completed on the display 11 (Step S32). For example, the display unit 26 displays the screen 81*i* in FIG. 13G on the display 11.

Figure 16:
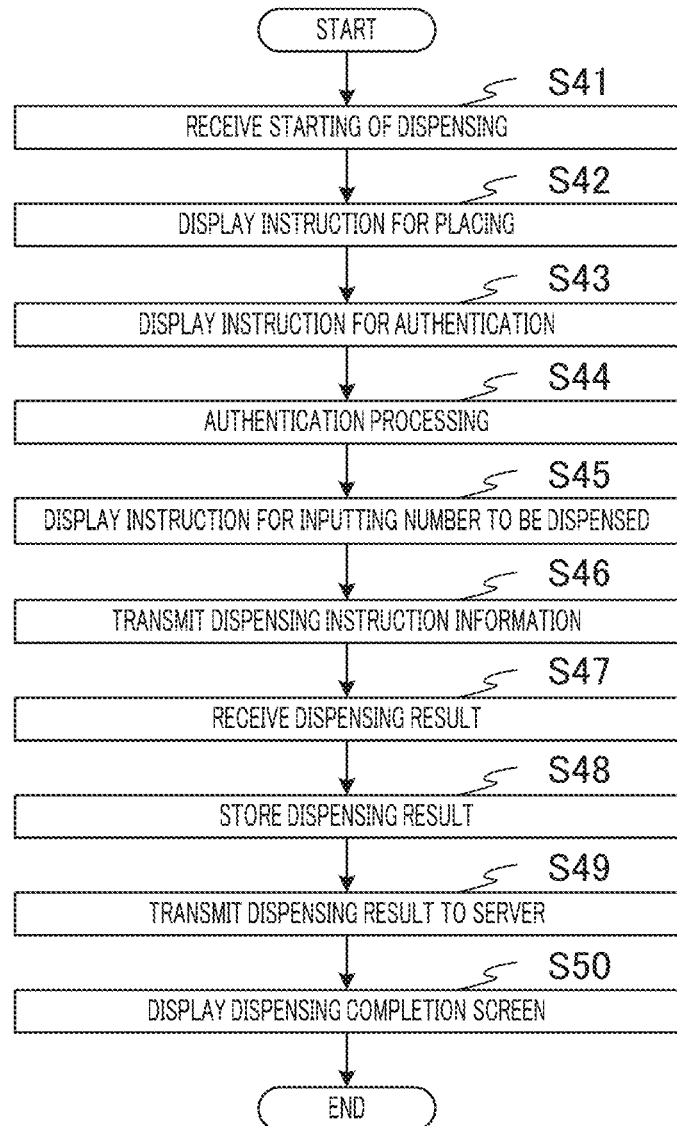
FIG. 16 is a flowchart illustrating an operation example in dispensing processing of the portable device.

FIG. 16 is a flowchart illustrating an operation example in the dispensing processing of the portable device 1*a*.

First, the accepting unit 21 accepts the operation for starting the dispensing from the user (Step S41). For example, the accepting unit 21 accepts the operation of pressing down the button 82*a* illustrated in FIG. 14A.

Next, the display unit 26 displays a screen that instructs the portable device 1*a* to be placed on the placing unit 3*a* on the display 11 in response to the acceptance of the dispensing starting operation in Step S41 (Step S42). For example, the display unit 26 displays the screen 82*b* illustrated in FIG. 14B on the display 11.

Next, when it is confirmed that the portable device 1*a* is placed on the placing unit 3*a*, the display unit 26 displays a screen that instructs the user to perform the user authentication on the display 11 (Step S43). For example, the display unit 26 displays the screen 82*c* illustrated in FIG. 14C on the display 11.

Next, the authentication unit 22 performs the authentication processing of the user (Step S44). For example, the authentication unit 22 transmits the fingerprint information on the user read by the fingerprint reading device 12 to the money dispensing device 3, and receives the authentication result from the money dispensing device 3.

Next, when the user authentication ends, the display unit 26 displays a screen that instructs the dispensed number of the pieces of money to be input on the display 11 (Step S45). For example, the display unit 26 displays the screen 82*d* illustrated in FIG. 14D on the display 11.

Next, when the accepting unit 21 accepts the dispensing instruction from the user, the transmitting unit 23 transmits the dispensing instruction information to the money dispensing device 3 (Step S46). For example, when the button 82*e* illustrated in FIG. 14D is pressed down, the transmitting unit 23 transmits the dispensing instruction information to the money dispensing device 3. For example, in the dispensing instruction information, the number to be dispensed for each denomination illustrated in FIG. 14D is included.

Note that, when the control unit 51 of the money dispensing device 3 receives the dispensing instruction information from the portable device 1*a*, the control unit 51 dispenses the pieces of money from the storage unit 52. Then, the control unit 51 of the money dispensing device 3 transmits the dispensing result including the information described in FIG. 6 to the portable device 1*a*.

Next, the receiving unit 24 receives the dispensing result from the money dispensing device 3 (Step S47).

Next, the storage 27 stores therein the dispensing result received in Step S47 (Step S48). As a result, in the storage 27, the depositing and dispensing table 27*a* as that shown in FIG. 6 is formed.

Next, the higher-level device communication unit 25 transmits the dispensing result received in Step S47 to the server 4 (Step S49). Note that the server 4 stores the dispensing result transmitted from the portable device 1*a* in the storage 72. As a result, in the storage 72 of the server 4, the depositing and dispensing table 72*a* shown in FIG. 12 is formed.

Next, when the transmission of the dispensing result to the server 4 in Step S49 is completed, the display unit 26 displays a screen indicating that the dispensing is completed on the display 11 (Step S50). For example, the display unit 26 displays the screen 82*g* in FIG. 14F on the display 11.

Figure 17:
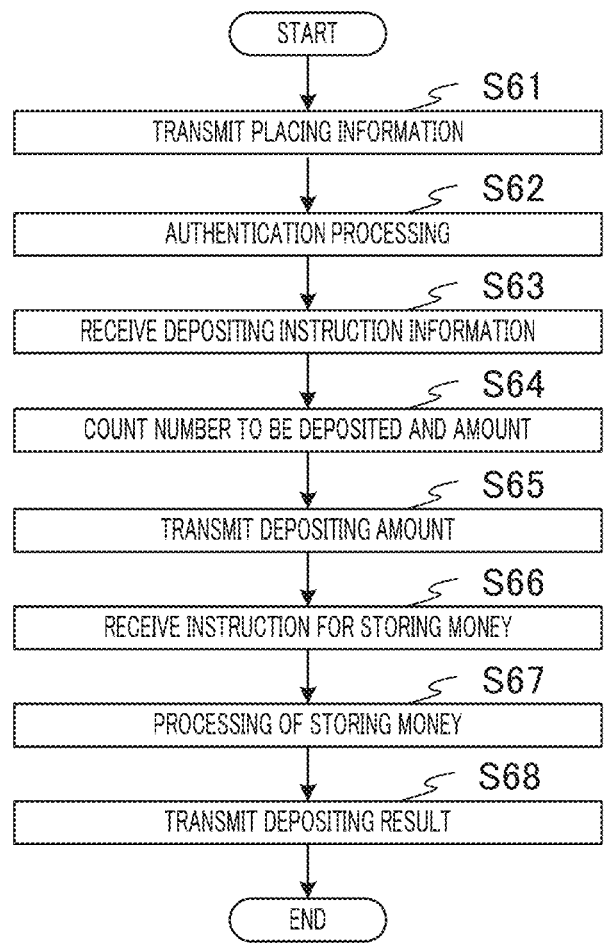
FIG. 17 is a flowchart illustrating an operation example of the money depositing device.

FIG. 17 is a flowchart illustrating an operation example of the money depositing device 2.

First, when the portable device 1*a* is placed on the placing unit 2*a*, the transmitting unit 42 transmits information indicating that the portable device 1*a* is placed on the placing unit 2*a* to the portable device 1*a* (Step S61). For example, the money depositing device 2 comprises a detecting unit that detects that the portable device 1*a* is placed on the placing unit 2*a*. When the placing of the portable device 11*a* is detected by the detecting unit, the transmitting unit 42 transmits information indicating that the portable device 1*a* is placed on the placing unit 2*a* to the portable device 1*a*.

Next, the authentication unit 44 performs user authentication processing (Step S62). For example, the authentication unit 44 performs the user authentication by matching the fingerprint information on the user received from the portable device 1*a* and the fingerprint information stored in the storage 45 with each other.

Next, the receiving unit 43 receives depositing instruction information from the portable device 1*a* (Step S63).

Next, the depositing processing unit 41 counts the number of the pieces of money for each denomination placed into the inlet 32 and the amount thereof in response to the reception of the depositing instruction information in Step S63 (Step S64). Note that the depositing processing unit 41 temporarily stores the counted pieces of money in the temporary storage units 36*a* to 36*c*.

Next, the transmitting unit 42 transmits the depositing amount counted in Step S64 to the portable device 1*a* (Step S65). As a result, the screen 81*f* and the button 81*g* illustrated in FIG. 13E are displayed on the display 11 of the portable device 1*a*.

Next, the receiving unit 43 receives the instruction for storing the pieces of money from the portable device 1*a* (Step S66). Note that, when the button 81*g* illustrated in FIG. 13E is pressed down, the instruction for storing the pieces of money is transmitted from the portable device 1*a*.

Next, the depositing processing unit 41 performs processing of storing the pieces of money (Step S67). For example, the depositing processing unit 41 stores the pieces of money temporarily stored in the temporary storage units 36*a* to 36*c* in the storage units 37*a* to 37*c*. Then, the depositing processing unit 41 generates the information on the depositing result.

Next, the transmitting unit 42 transmits the depositing result generated by the depositing processing unit 41 to the portable device 1*a* (Step S68).

Note that the transaction starting date and time of depositing is when the depositing instruction information is received in Step S63, for example. The transaction ending date and time of the depositing is when the depositing result is transmitted in Step S68, for example.

Figure 18:
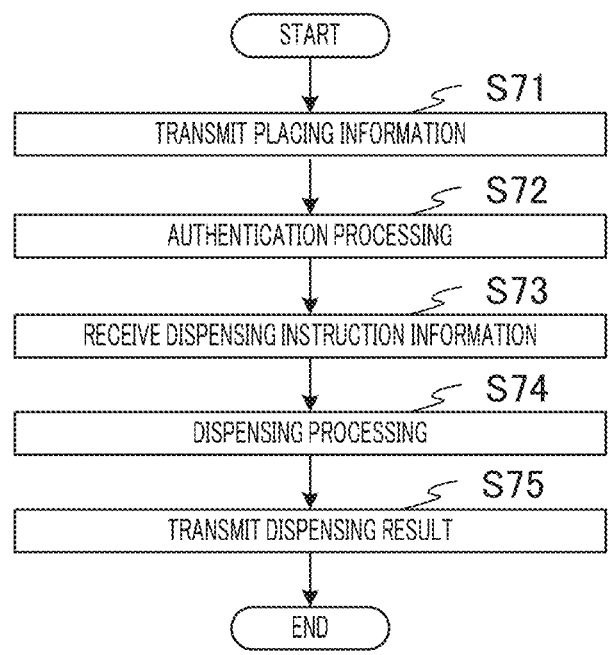
FIG. 18 is a flowchart illustrating an operation example of the money dispensing device.

FIG. 18 is a flowchart illustrating the operation example of the money dispensing device 3.

First, when the portable device 1*a* is placed on the placing unit 3*a*, the transmitting unit 62 transmits information indicating that the portable device 1*a* is placed on the placing unit 3*a* to the portable device 1*a* (Step S71). For example, the money dispensing device 3 comprises a detecting unit that detects that the portable device 1*a* is placed on the placing unit 3*a*. The transmitting unit 62 transmits information indicating that the portable device 1*a* is placed on the placing unit 3*a* when the placing of the portable device 1*a* is detected by the detecting unit.

Next, the authentication unit 64 performs the user authentication processing (Step S72). For example, the authentication unit 64 performs the user authentication by matching the fingerprint information on the user received from the portable device 1*a* and the fingerprint information stored in the storage 65 with each other.

Next, the receiving unit 63 receives the dispensing instruction information from the portable device 1*a* (Step S73). Note that the dispensing instruction information is transmitted from the portable device 1*a* when the button 82*e* illustrated in FIG. 14D is pressed down.

Next, the dispensing processing unit 61 performs the dispensing processing (Step S74). For example, the dispensing instruction information received in Step S73 includes information on the denomination and the number of the dispensed pieces of money. The dispensing processing unit 61 dispenses the pieces of money of the denomination included in the dispensing instruction information to the outlet 55 from the storage unit 52 by the number included in the dispensing instruction information. Then, the dispensing processing unit 61 generates the information on the dispensing result.

Next, the transmitting unit 62 transmits the dispensing result generated by the dispensing processing unit 61 to the portable device 1*a* (Step S75).

Note that the transaction starting date and time of the dispensing is when the dispensing instruction information is received m Step S73, for example. The transaction ending date and time of the dispensing is when the dispensing result is transmitted in Step S75, for example.

As described above, the receiving unit 43 of the money depositing device 2 receives the depositing instruction information on the depositing instruction from the user that is accepted by the portable devices 1*a* to 1*f* from the portable devices 1*a* to 1*f* by wireless communication. The depositing processing unit 41 performs the depositing processing of the pieces of money placed into the inlet 32 by the user in accordance with the depositing instruction information received by the receiving unit 43. The transmitting unit 42 transmits the depositing result of the depositing processing performed by the depositing processing unit 41 to the portable devices 1*a* to 1*f* by wireless communication. As a result, the money depositing device 2 can reduce the cost of the device and can simplify the depositing management.

For example, the portable devices 1*a* to 1*f* are in charge of the input and output function of the money depositing device 2, and hence the money depositing device 2 does not necessarily need to comprise an input and output device such as a display or a key device, and the cost can be reduced. The money depositing device 2 does not necessarily need to comprise a storage that stores the depositing result therein, and the cost can be reduced. The money depositing device 2 transmits the depositing result to the portable devices 1*a* to 1*f*, and hence the user can use the portable devices 1*a* to 1*f* as mobile passbooks, and the depositing management becomes easier.

The receiving unit 63 of the money dispensing device 3 receives the dispensing instruction information on the dispensing instruction accepted from the user by the portable devices 1a to 1f from the portable devices 1a to 1f by wireless communication. The dispensing processing unit 61 performs the dispensing processing of the pieces of money stored in the storage unit 52 in accordance with the dispensing instruction information received by the receiving unit 63. The transmitting unit 62 transmits the dispensing result of the dispensing processing performed by the dispensing processing unit 61 to the portable devices 1a to 1f by wireless communication. As a result, the money dispensing device 3 can reduce the cost of the device, and can simplify the dispensing management.

For example, the portable devices 1a to 1f are in charge of the input and output function of the money dispensing device 3, and hence the money dispensing device 3 does not necessarily need to comprise an input and output device such as a display or a key device, and the cost can be reduced. The money dispensing device 3 does not necessarily need to comprise a storage that stores the dispensing result therein and the cost can be reduced. The money dispensing device 3 transmits the dispensing result to the portable devices 1a to 1f, and hence the user can use the portable devices 1a to 1f as mobile passbooks, and the dispensing management becomes easier.

The transmitting unit 23 of each of the portable devices 1a to 1f transmits the depositing instruction information on the depositing instruction accepted from the user to the money depositing device 2 by wireless communication. The receiving unit 24 receives the depositing result from the money depositing device 2 that has performed the depositing processing of the pieces of money placed into the inlet 32 by the user by wireless communication in accordance with the depositing instruction information transmitted by the transmitting unit 23. The storage 27 stores the depositing result received by the receiving unit 24 therein. As a result, the portable devices 1a to 1f can reduce the cost of the device and can simplify the depositing management.

For example, the portable devices 1a to 1f are in charge of the input and output function of the money depositing device 2, and hence the money depositing device 2 does not necessarily need to comprise an input and output device such as a display or a key device, and the cost can be reduced. The money depositing device 2 does not necessarily need to comprise a storage that stores the depositing result therein, and the cost can be reduced. The money depositing device 2 transmits the depositing result to the portable devices 1a to 1f, and hence the user can use the portable devices 1a to 1f as mobile passbooks, and the depositing management becomes easier.

The transmitting unit 23 of each of the portable devices 1a to 1f transmits the dispensing instruction information on the dispensing instruction accepted from the user to the money dispensing device 3 by wireless communication. The receiving unit 24 receives the dispensing result from the money dispensing device 3 that has performed the dispensing processing of the pieces of money stored in the storage unit 52 by wireless communication in accordance with the dispensing instruction information transmitted by the transmitting unit 23. The storage 27 stores the dispensing result received by the receiving unit 24 therein. As a result, the portable devices 1a to 1f can reduce the cost of the device, and can simplify the dispensing management.

For example, the portable devices 1a to 1f are in charge of the input and output function of the money dispensing device 3, and hence the money dispensing device 3 does not necessarily need to comprise an input and output apparatus such as a display or a key device, and the cost can be reduced. The money dispensing device 3 does not necessarily need to comprise a storage that stores the dispensing result therein and the cost can be reduced. The money dispensing device 3 transmits the dispensing result to the portable devices 1a to 1f, and hence the user can use the portable devices 1a to 1f as mobile passbooks, and the dispensing management becomes easier.

Note that the accepting unit 21 of each of the portable devices 1a to 1f may accept the depositing amount from the user, and the transmitting unit 23 may transmit the depositing amount accepted by the accepting unit 21 to the money depositing device 2 by including the depositing amount in the depositing instruction information. For example, in the screen illustrated in FIG. 13D, the accepting unit 21 may accept the depositing amount, and the transmitting unit 23 may transmit the depositing amount to the money depositing device 2 when the button 81e is pressed down. Then, the depositing processing unit 41 of the money depositing device 2 may compare the depositing amount included in the depositing instruction information transmitted from the portable devices 1a to 1f with the result obtained by counting the amount of the pieces of money placed into the inlet 32 by the user, and transmit the result of comparison to the portable devices 1a to 1f. The portable devices 1a to 1f can notify the user of a mistake in the depositing amount by displaying the result of comparison on the display 11.

The dispensing processing unit 61 of the money dispensing device 3 may compare the dispensing amount included in the dispensing instruction information transmitted from the portable devices 1a to 1f with the result obtained by counting the amount of the pieces of money dispensed from the outlet 55. When the result of comparison is different, the dispensing processing unit 61 may redo the dispensing processing.

The money depositing device 2 may comprise a communication control unit that ends the wireless communication with the portable devices 1a to 1f after the depositing result is transmitted to the portable devices 1a to 1f. For example, the communication control unit ends (ends the call of) the wireless communication of the transmitting unit 42 and the receiving unit 43 after the transmitting unit 42 transmits the depositing result to the portable devices 1a to 1f. As described above, the money depositing device 2 can simplify the depositing operation of the user by ending the wireless communication without accepting the operation for ending the communication from the user after the depositing processing of the user ends. Note that, the communication control unit may start the wireless communication with the portable devices 1a to 1f when the portable devices 1a to 1f are placed on the placing unit 2a. For example, when the detecting unit detects that the portable devices 1a to 1f are placed on the placing unit 2a, the communication control unit may start the operation of the transmitting unit 42 and the receiving unit 43, and may start the wireless communication.

The money dispensing device 3 may comprise the communication control unit that ends the wireless communication with the portable devices 1a to 1f after the dispensing result is transmitted to the portable devices 1a to 1f. For example, the communication control unit ends the wireless communication of the transmitting unit 62 and the receiving unit 63 after the transmitting unit 62 transmits the dispensing result to the portable devices 1a to 1f. As described above, the money dispensing device 3 can simplify the dispensing operation of the user by ending the wireless communication without accepting the operation for ending the communication from the user after the dispensing processing of the user ends. Note that the communication control unit may start the wireless communication with the portable devices 1a to 1f when the portable devices 1a to 1f are placed on the placing unit 3a. For example, when the detecting unit detects that the portable devices 1a to 1f are placed on the placing unit 3a, the communication control unit may start the operation of the transmitting unit 62 and the receiving unit 63, and may start the wireless communication.

The portable devices 1a to 1f, the money depositing device 2, and the money dispensing device 3 may perform wireless communication by Bluetooth (Registered Trademark).

The portable devices 1a to 1f, the money depositing device 2, and the money dispensing device 3 may perform NFC pairing, and then perform wireless communication by Bluetooth.

The wireless communication described above also includes communication using a QR code. For example, the portable devices 1a to 1f display a QR code on the display 11. The money depositing device 2 may scan the QR code displayed on the display 11, and may receive the depositing instruction information from the scanned QR code. The portable devices 1a to 1f display the QR code on the display 11. The money dispensing device 3 may scan the QR code displayed on the display 11, and may receive the dispensing instruction information from the scanned QR code.

The portable devices 1a to 1f may scan a QR code put on the money depositing device 2 and the money dispensing device 3 with use of the imaging device 13, and perform pairing by Bluetooth.

The portable devices 1a to 1f perform wireless communication by being placed on the money depositing device 2 and the money dispensing device 3, but the present invention is not limited thereto. For example, the portable devices 1a to 1f may perform wireless communication with the money depositing device 2 and the money dispensing device 3 within the range of several meters without being placed on the placing units 2a and 3a. In other words, the user may operate the money depositing device 2 and the money dispensing device 3 while holding the portable devices 1a to 1f.

The depositing result transmitted to the portable devices 1a to 1f by the money depositing device 2 does not necessarily need to include the information on the amount deposited by the user. For example, the portable device 1a may store the information on the amount accepted by the user in the storage 27.

The dispensing result transmitted to the portable devices 1a to 1f by the money depositing device 2 does not necessarily need to include the information on the amount taken out by the user. For example, the portable device 1a may store the information on the amount accepted by the user in the storage 27.

The money depositing device 2 may have a function for dispensing the pieces of money (the function of the money dispensing device 3). The money dispensing device 3 may have a function for depositing the pieces of money (the function of the money depositing device 2).

The user authentication may be performed with only the portable devices 1a to 1f. In other words, the portable devices 1a to 1f may perform the user authentication by storing the fingerprint information on the user and the like therein.

The money depositing device 2 may comprise the fingerprint reading device. The money depositing device 2 may perform the user authentication by matching the fingerprint information read by the fingerprint reading apparatus and the fingerprint information stored in the storage 45 with each other. In other words, the money depositing device 2 may independently perform the user authentication. The same applies to the money dispensing device 3.

The money depositing device 2 may transmit the fingerprint information read by the fingerprint reading device to the server 4 that is the higher-level device via the portable devices 1a to 1f. Then, the server 4 may perform the user authentication on the basis of the fingerprint information. The same applies to the money dispensing device 3.

The contents disclosed in the description, the accompanying drawings, and the abstract included in Japanese Patent Application No. 2017-041904 filed on Mar. 6, 2017 are incorporated herein by reference in their entirety.

REFERENCE SIGNS LIST 1a to 1f Portable device
2 Money depositing device
2a Placing unit
3 Money dispensing device
3a Placing unit
4 Server
21 Accepting unit
22, 44, 64 Authentication unit
23, 42, 62 Transmitting unit
24, 43, 63 Receiving unit
25 Higher-level device communication unit
26 Display
27, 45, 65 Storage
41 Depositing processing unit
61 Dispensing processing unit

The invention claimed is:

1. A money depositing device, comprising:
a placing unit on which a portable device is placed;
a detecting unit that detects that the portable device is placed on the placing unit;
a receiving unit that receives depositing instruction information on a depositing instruction from the portable device placed on the placing unit by wireless communication, the depositing instruction being accepted by the portable device from a user;
a depositing processing unit that performs depositing processing of money placed into an inlet by the user in accordance with the depositing instruction information received by the receiving unit; and
a transmitting unit that transmits information indicating that the portable device is placed on the placing unit to the portable device by wireless communication, and transmits a depositing result of the depositing processing performed by the depositing processing unit to the portable device by wireless communication.

2. The money depositing device according to claim 1, wherein the depositing processing unit compares a depositing amount included in the depositing instruction information with a result of recognizing and counting the money placed into the inlet.

3. The money depositing device according to claim 2, further comprising a communication control unit that ends the wireless communication with the portable device after the depositing result is transmitted to the portable device.

4. The money depositing device according to claim 1, further comprising a communication control unit that ends the wireless communication with the portable device after the depositing result is transmitted to the portable device.

5. A money dispensing device, comprising:
- a placing unit on which a portable device is placed;
- a detecting unit that detects that the portable device is placed on the placing unit;
- a receiving unit that receives dispensing instruction information on a dispensing instruction from the portable device placed on the placing unit by wireless communication, the dispensing instruction being accepted by the portable device from a user;
- a dispensing processing unit that performs dispensing processing of money stored in a storage unit in accordance with the dispensing instruction information received by the receiving unit; and
- a transmitting unit that transmits information indicating that the portable device is placed on the placing unit to the portable device by wireless communication, and transmits a dispensing result of the dispensing processing performed by the dispensing processing unit to the portable device by wireless communication.

6. The money dispensing device according to claim 5, wherein the dispensing processing unit compares a dispensing amount included in the dispensing instruction information with an amount of the money dispensed from the outlet.

7. The money dispensing device according to claim 6, further comprising a communication control unit that ends the wireless communication with the portable device after the dispensing result is transmitted to the portable device.

8. The money dispensing device according to claim 5, further comprising a communication control unit that ends the wireless communication with the portable device after the dispensing result is transmitted to the portable device.

9. A portable device accepting a depositing instruction from a user, the portable device comprising:
- an instruction unit that instructs the portable device to be placed on a money depositing device, based on the depositing instruction;
- a transmitting unit that transmits depositing instruction information on the depositing instruction to the money depositing device by wireless communication, when receiving information indicating that the portable device is placed on the money depositing device from the money depositing device;
- a receiving unit that receives a depositing result by wireless communication from the money depositing device that has performed depositing processing of money placed into an inlet by the user in accordance with the depositing instruction information transmitted by the transmitting unit; and
- a storage that stores therein the depositing result received by the receiving unit.

10. The portable device according to claim 9, further comprising a higher-level transmitting unit that transmits the depositing result received by the receiving unit to a higher-level device.

11. The portable device according to claim 10, further comprising a display that displays that the depositing processing is completed, after the higher-level transmitting unit transmits the depositing result to the higher-level device.

12. The portable device according to claim 9, further comprising an authentication unit transmitting user information for authentication to the money depositing device, when receiving information indicating that the portable device is placed on the money depositing device from the money depositing device.

13. A portable device accepting a dispensing instruction from a user, the portable device comprising:
- an instruction unit that instructs the portable device to be placed on a money dispensing device, based on the dispensing instruction;
- a transmitting unit that transmits dispensing instruction information on the dispensing instruction to the money dispensing device by wireless communication, when receiving information indicating that the portable device is placed on the money dispensing device from the money dispensing device;
- a receiving unit that receives a dispensing result by wireless communication from the money dispensing device that has performed dispensing processing of money stored in a storage unit in accordance with the dispensing instruction information transmitted by the transmitting unit; and
- a storage that stores therein the dispensing result received by the receiving unit.

14. The portable device according to claim 13, further comprising a higher-level transmitting unit that transmits the dispensing result received by the receiving unit to a higher-level device.

15. The portable device according to claim 14, further comprising a display that displays that the dispensing processing is completed, after the higher-level transmitting unit transmits the dispensing result to the higher-level device.

16. The portable device according to claim 13, further comprising an authentication unit transmitting user information for authentication to the money dispensing device, when receiving information indicating that the portable device is placed on the money dispensing device from the money dispensing device.

17. A depositing and dispensing system, comprising:
- a money depositing device;
- a money dispensing device; and
- a portable device, wherein:
- the money depositing device comprises:
  - a first placing unit on which the portable device is placed;
  - a first detecting unit that detects that the portable device is placed on the first placing unit;
  - a depositing receiving unit that receives depositing instruction information on the depositing instruction from the portable device placed on the first placing unit by wireless communication, the depositing instruction being accepted by the portable device from a user;
  - a depositing processing unit that performs depositing processing of money placed into an inlet by the user, in accordance with the depositing instruction information received by the depositing receiving unit; and
  - a depositing transmitting unit that transmits information indicating that the portable device is placed on the first placing unit to the portable device by wireless communication, and transmits a depositing result of the depositing processing performed by the depositing processing unit to the portable device by wireless communication;
- the money dispensing device comprises:
  - a second placing unit on which the portable device is placed;
  - a second detecting unit that detects that the portable device is placed on the second placing unit;
  - a dispensing receiving unit that receives dispensing instruction information on a dispensing instruction from the portable device placed on the second placing unit by wireless communication, the dispensing instruction being accepted by the portable device from the user;

a dispensing processing unit that performs dispensing processing of money stored in a storage unit, in accordance with the dispensing instruction information received by the dispensing receiving unit; and a dispensing transmitting unit that transmits information indicating that the portable device is placed on the second placing unit to the portable device by wireless communication, and transmits a dispensing result of the dispensing processing performed by the dispensing processing unit to the portable device by wireless communication; and the portable device comprises:

an instruction unit that instructs the portable device to be placed on the first placing unit or the second placing unit, based on the depositing instruction or the dispensing instruction; and a storage that stores therein the depositing result transmitted from the money depositing device or the dispensing result transmitted from the money dispensing device.

18. The depositing and dispensing system according to claim 17, wherein the portable device further comprises a higher-level transmitting unit that transmits the depositing result transmitted from the money depositing device or the dispensing result transmitted from the money dispensing device to a higher-level device.

19. The depositing and dispensing system according to claim 17, wherein the portable device further comprises an authentication unit transmitting user information for authentication to the money depositing device or the money dispensing device, when receiving information indicating that the portable device is placed on the money depositing device or the money dispensing device from the money depositing device or the money dispensing device.

* * * * *